(12) United States Patent
Deutsch

(10) Patent No.: US 11,011,005 B2
(45) Date of Patent: May 18, 2021

(54) SYSTEMS AND METHODS FOR PRESERVING THE ANONYMITY OF PROVISIONAL BALLOTS

(71) Applicant: Election Systems & Software, LLC, Omaha, NE (US)

(72) Inventor: Herman Deutsch, Mundelein, IL (US)

(73) Assignee: ELECTION SYSTEMS & SOFTWARE, LLC, Omaha, NE (US)

( * ) Notice: Subject to any disclaimer, the term of this patent is extended or adjusted under 35 U.S.C. 154(b) by 345 days.

(21) Appl. No.: 16/256,420

(22) Filed: Jan. 24, 2019

(65) Prior Publication Data
US 2020/0242872 A1    Jul. 30, 2020

(51) Int. Cl.
*G06K 17/00*  (2006.01)
*G07C 13/00*  (2006.01)
*G06F 21/62*  (2013.01)
*G06F 16/9035*  (2019.01)
*G09F 3/00*  (2006.01)
*H04L 9/08*  (2006.01)

(52) U.S. Cl.
CPC ......... *G07C 13/00* (2013.01); *G06F 16/9035* (2019.01); *G06F 21/6254* (2013.01); *G09F 3/0297* (2013.01); *H04L 9/0847* (2013.01); *G06Q 2230/00* (2013.01)

(58) Field of Classification Search
CPC .......... G07C 13/00; G07C 13/02; G07C 9/38; G06Q 2230/00; H04L 2209/463; H04L 2209/42; G06F 21/31

USPC .................. 235/51, 386; 705/12, 74
See application file for complete search history.

(56) References Cited

U.S. PATENT DOCUMENTS

| | | |
|---|---|---|
| 5,583,329 A | 12/1996 | Davis, III et al. |
| 6,854,644 B1 | 2/2005 | Bolton et al. |
| 7,080,779 B2 | 7/2006 | Cummings |
| 7,100,828 B2 | 9/2006 | Cummings |
| 7,163,147 B2 | 1/2007 | Cummings |
| 7,222,787 B2 | 5/2007 | Cummings |
| 7,314,171 B2 | 1/2008 | Cummings |
| 7,314,172 B2 | 1/2008 | Vanek |
| 7,344,071 B2 | 3/2008 | Cummings et al. |
| 7,387,244 B2 | 6/2008 | Bolton |
| 7,566,006 B2 | 7/2009 | Cummings |
| 7,753,273 B2 | 7/2010 | Cummings |
| 8,063,885 B2 | 11/2011 | Vanek |
| 8,096,471 B2 | 1/2012 | Cummings et al. |

(Continued)

*Primary Examiner* — Jamara A Franklin
(74) *Attorney, Agent, or Firm* — Stinson LLP

(57) ABSTRACT

A computer-implemented method for preserving the anonymity of a provisional ballot cast by a voter in an election whose eligibility to vote in the election is not yet determined comprises including a machine-readable identification marking representing an identification code associated with the voter on the paper card utilized by a voting device associating the identification code represented by the machine-readable identification marking with the contest choices stored in the results database. In this manner, upon a determination that the voter is either eligible or ineligible to vote in the election, the contest choices of the voter can be included in or excluded from, respectively, the results of the election by identifying the identification code associated with the voter and including or excluding, respectively, the contest choices associated with the identification code.

20 Claims, 7 Drawing Sheets

(56) References Cited

U.S. PATENT DOCUMENTS

| | | |
|---|---|---|
| 8,136,729 B2 | 3/2012 | Bolton |
| 8,191,764 B2 | 6/2012 | Bolton |
| 8,260,660 B2 | 9/2012 | Carbullido |
| 8,261,984 B2 | 9/2012 | Baumert et al. |
| 8,352,312 B2 | 1/2013 | Carbullido |
| 8,651,380 B2 | 2/2014 | Baumert |
| 8,733,646 B2 | 5/2014 | Bolton et al. |
| 8,812,594 B2 | 8/2014 | Iredale et al. |
| 8,814,045 B1 | 8/2014 | Brockhouse et al. |
| 8,840,022 B1 | 9/2014 | Roger |
| 8,944,326 B2 | 2/2015 | Bolton et al. |
| 8,991,701 B2 | 3/2015 | Bolton |
| 9,092,923 B2 | 7/2015 | Bolton |
| 9,105,139 B2 | 8/2015 | Bolton et al. |
| 9,240,085 B2 | 1/2016 | Baumert et al. |
| 10,147,259 B1 | 12/2018 | Dvorak |
| 2004/0169077 A1* | 9/2004 | Petersen ................ G07C 13/00 235/386 |

* cited by examiner

SYSTEMS AND METHODS FOR PRESERVING THE ANONYMITY OF PROVISIONAL BALLOTS

TECHNICAL FIELD

Aspects of the present disclosure generally relate to voting systems and methods and, more particularly, to systems and methods that preserve the anonymity of provisional ballots.

BACKGROUND

Provisional ballots are generally associated with voters in an election whose eligibility to vote in the election cannot be confirmed at the poll location. This is typically the result of a voter showing up to vote at the poll on an election day but he or she is not listed on the voter registration role for the poll. There are many reasons why a voter may not be on the voter registration role. For example, the voter may not have registered in time, the voter may have recently moved, the poll location is not associated with the voter's permanent residence or some other reason. Another reason a voter's eligibility to vote in an election cannot be confirmed is due to early voting. Typically, voters who vote early will cast a provisional ballot so that after the election, officials can check and make sure the early voter did not subsequently re-cast another ballot on the day of the election. In any case, a voter whose eligibility to vote the election cannot be determined, is provided a provisional ballot to vote with. These provisional ballots are not typically included in the election results until the voter's eligibility has been confirmed.

To permit a provisional ballot to be included in the results, typically the voter and provisional ballot are identified with a code, which may be pulled from a pre-designated list or issued by a poll book electronic system, for use in subsequent processing after eligibility is validated. In this manner, the particular provisional ballot can be tracked using the code and included or excluded from the results once the voter's eligibility is determined. After the close of the election, the eligibility of voters who have been designated provisional or challenged (e.g., given a code) is determined and a process is used to include the provisional ballots from voters who were eligible in the results and/or exclude the provisional ballots from voters who were ineligible in the results.

A variety of different types of voting equipment are used in the United States and throughout the world and each type of voting equipment utilizes different techniques for processing provisional ballots in order to maintain the anonymity of the voter who cast the provisional ballot. In jurisdictions where a voter receives a paper ballot on which the various contests to be voted on are printed, any of these paper ballots that are identified as provisional ballots may be placed in a first envelope, which is in turn inserted into a second envelope. The second, outer envelope is labeled with the code associated with the voter while the inner envelope is not marked to preserve vote anonymity and secrecy. When determining whether to include or exclude the provisional ballot, an official utilizes the code on the second envelope to determine whether the corresponding voter was eligible to vote. If the voter was eligible to vote, the official removes the first envelope from the second envelope and places it in a pile to be included in the election results. In this manner, the official is able to make a determination about the eligibility of the voter without ever having access (e.g., visual access) to the provisional ballot and the contest choices therein—preserving the anonymity and secrecy of the provisional ballot.

In jurisdictions where a voter uses an electronic voting machine, such as a direct recording electronic (DRE) voting machine, the code associated with the voter may simply be entered into the electronic voting machine by a poll worker. The electronic voting machine then stores the code in the database containing the cast vote record (CVR) for each ballot but segregates the provisional ballot or otherwise handles the ballot so that the vote sections contained therein are not included in the results until the voter's eligibility has been determined. After the election, the CVRs are uploaded into a database of an election management system along with the associated codes. After the eligibility of each voter is determined, the corresponding codes associated with the voters whose ballot inclusion and/or exclusion from the results have changed, are entered into the election management system. The election management system then uses the entered codes to locate all the associated CVRs whose selections will be included in or excluded from the results and updates the results. The election management system may also update the CVR and/or the database to show which CVRs are now included and/or excluded from the results based on the determined eligibility. Accordingly, the election management system provides anonymity and secrecy of the contents of the provisional ballot by preventing the operator of the election management system from viewing the selections of the provisional ballot.

In jurisdictions where a voter uses a hybrid voting machine, a voting machine that allows a user to electronically make their contest choices like an electronic voting machine but then prints a paper record of the contest choices that is subsequently scanned to form the CVR for the ballot, the handling of provisional ballots takes special consideration and extra effort as there is currently no way to include the provisional ballot in the tabulated results at the poll location with the option to include or exclude the corresponding contest choices in the results. One method of handling provisional ballots from hybrid voting machines is to treat the printed paper record from the hybrid voting machine like paper ballot, which allows the provisional ballot to be electronically voted and verified without including the provisional ballot in the results. In this method, the hybrid voting machine is set up to print the provisional ballot on the paper record with a review box that is marked. The marked review box indicates the ballot will be verified but rejected for tabulation. The printed paper record becomes the summary ballot after the vote is completed and when the paper record is inserted into a scanner for tabulation (e.g., scanned to generate the CVR included in the results), the scanner reads the marked review box and unconditionally returns the paper record and doesn't include the selections in the results. The returned paper record is then placed into the first and second envelopes, as described above, with a code marked on the second envelope, just like a provisional paper ballot.

Moreover, during early voting/in-person absentee voting, some jurisdictions, especially those using electronic voting machines, will assign a code to each voter but will also include all ballots cast in the early voting/in-person absentee voting in the result count (e.g., all ballots cast during early voting/in-person absentee voting are considered provisional ballots). This accommodates certain jurisdictional rules that allow a voter to vote on a designated election day subsequent to participating in early voting/in-person absentee voting and have the earlier cast ballot voided or where eligibility to vote is in question. After the close of the election, a list of the voter codes is made of those voters whose ballots are to be removed from the results. This is similar to the process used to remove the provisional ballots from the results for electronic voting machines by assigning a code to the voter. In this case, the election management system is used to select the codes of all ballots that are to be excluded from the results. The election management system accesses the CVR associated with each code and removes the contest choices from the results. The election management system may also change the status of the CVR to indicate the contest choices contained in the CVR are now removed from the results. Again, the operator using the election management system does not have access to the contents of the provisional ballot. Likewise, early voting/in-person absentee paper ballots are handled in a similar fashion to that of provisional paper ballots, described above. However, there is no method for scanning all ballots cast in early voting/in-person absentee voting to create the CVR at the poll location and including the ballot in the results with the option to subsequently remove the ballot from the results using the hybrid voting machine. At best, when using the hybrid voting machine, the printed paper record from the early voting/in-person absentee voting is treated like a paper ballot, as described above.

SUMMARY

In one aspect, a voting system for preserving the anonymity of a provisional ballot cast by a voter in an election whose eligibility to vote in the election is not yet determined comprises a voting device configured to receive any and all contest choices from the voter and to mark the any and all contest choices on a paper card associated with the voter. The voting device is further configured to discharge the paper card from the voting device after the paper card is marked with the any and all contest choices. The paper card includes a machine-readable identification marking representing an identification code associated with a voter when the paper card is discharged from the voting device. The voting system further including a processing device configured to receive the paper card, read the any and all contest choices marked on the paper card, and store the any and all contest choices in a results database. The processing device is also configured to read the machine-readable identification marking and associate the identification code represented by the machine-readable identification marking with the any and all contest choices stored in the results database. As a result, upon a determination that the voter is eligible to vote in the election, the any and all contest choices of the voter is included in at least one result of the election by identifying the identification code associated with the voter and including the any and all contest choices associated with the identification code.

In another aspect, a computer-implemented method for preserving the anonymity of a provisional ballot cast by a voter in an election whose eligibility to vote in the election is not yet determined comprises discharging the paper card from the voting device, wherein the paper card has any and all contest choices from the voter marked thereon and includes a machine-readable identification marking representing an identification code associated with the voter when the paper card is discharged from the voting device; reading the any and all contest choices marked on the paper card; storing the any and all contest choices in a results database; reading the machine-readable identification marking from the paper card; and associating the identification code represented by the machine-readable identification marking with the any and all contest choices stored in the results database. As a result, upon a determination that the voter is either eligible or ineligible to vote in the election, the any and all contest choices of the voter can be included in or excluded from, respectively, at least one result of the election by identifying the identification code associated with the voter and including or excluding, respectively, the any and all contest choices associated with the identification code.

BRIEF DESCRIPTION OF THE DRAWINGS

Corresponding reference characters indicate corresponding parts throughout the drawings.

DETAILED DESCRIPTION

Figure 1:
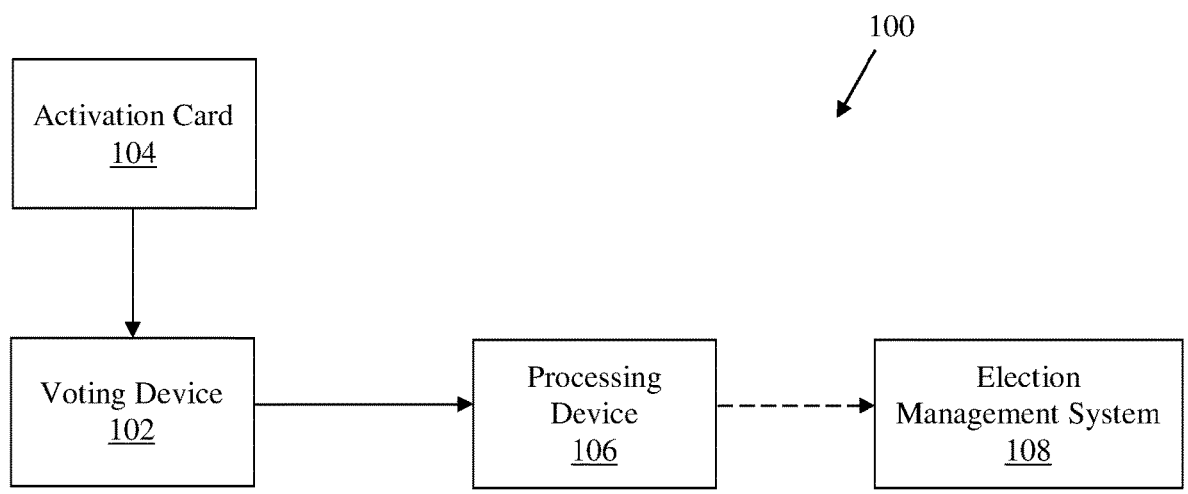
FIG. 1 is a block diagram illustrating an exemplary voting system according to an embodiment.

Generally, the present disclosure describes systems and methods for maintaining the anonymity and secrecy of provisional ballots and/or ballots cast during early voting/in-person absentee voting by a paper-based voting system, such as a system using a hybrid voting machine or a system using paper ballots. In particular, the system and methods described herein may be used to cast provisional ballots, using a hybrid voting machine or paper ballots, in a manner in which the provisional ballots can be recorded (e.g., included in the cast vote record) at the poll location and subsequently validated following the close of the election and included in the election results and/or invalidated and excluded from the election results, all while preserving the anonymity of the voter who casted the provisional ballot. The systems and methods described herein may also be used to cast a ballot, using a hybrid voting machine or a paper ballot, during early voting/in-person absentee voting in a manner in which the early voting/in-person absentee ballots can be recorded at the poll location and subsequently validated following the close of the election and included in the election results and/or invalidated and excluded from the election results, all while preserving the anonymity of the voter who casted the provisional ballot. It is to be understood that the systems and methods described herein are not limited in use and scope with hybrid voting machines and/or with paper ballots and may be used with other voting systems and methods.

The systems and methods described herein enable a paper-based voting system, such as a hybrid voting system or a paper ballot voting system, to include ballots in the tabulated results immediately after the voter makes his or her contest choices (e.g., voting selections) on the ballot and allows the ballots and corresponding contest choices to be subsequently validated and included in the election results and/or invalidated and excluded from the election results. In an embodiment, the ballot is a paper ballot that can be scanned at the election site to generate the CVR added to the results database. To achieve this functionality, the ballot (e.g., the paper ballot, the printed paper record such as a summary card, etc.) includes a machine-readable identification marking associated with a unique voter code assigned to the voter which is used to link the voter code to the cast vote record (CVR) created when the ballot is scanned. The CVR is stored information, which accounts for all available contest selections by representing all the contest choices made by the voter in each contest on the ballot. In order to subsequently include and/or exclude the contest choices contained in the CVR from the results, the voter code assigned to the voter must be linked to or associated with the CVR. However, in order to maintain ballot anonymity and secrecy, the voter code cannot be printed on the ballot nor directly linked to the CVR associated with the ballot cast by the voter. If the voter code is directly printed on the ballot, an election official could simply find the ballot with the voter code and view the contest choices of the voter. In order to indirectly link the voter code to the corresponding CVR, preferably the machine-readable identification marking represents an obfuscated (e.g., encrypted) voter code and it is the obfuscated voter code that is then used to identify the corresponding CVR associated with the voter—to eliminate direct association between the voter code and the CVR. The CVR is linked to or includes the obfuscated voter code. This isolates the machine-readable identification marking and corresponding encryption code used to identify the corresponding CVR from the voter code that is directly associated with the voter. To subsequently identify the CVRs and their corresponding contest choices to include or exclude from the results, a key (e.g., encryption key) is required to link the voter code to its corresponding obfuscated voter code. Accordingly, this obfuscation prevents a person from being able to directly link a voter with their corresponding vote sections on the ballot and contained in the CVR.

Referring to FIG. 1, one embodiment of a voting system in accordance with the present disclosure is generally indicated by 100. The voting system 100 includes a voting device, generally indicated by 102, a paper card, generally indicated by 104, a processing device (e.g., optical scan tabulating unit), generally indicated at 106, and an election management system, generally indicated by 108. In one embodiment, the voting system 100 may also include a poll book device (not shown).

The voting device 102 is configured to receive a paper card 104 from a voter, allow the voter to identify all their contest choices, mark all voter selected contest choices on the paper card along with a marking identifying the paper card as a completed ballot, and discharge the paper card from the voting device after the paper card is fully marked. In other words, the voting device 102 is configured to receive any and all contest choices (broadly, one or more contest choices) from the voter, mark the any and all contest choices on the paper card 104 and discharge the paper card from the voting device after the paper card is marked with the any and all contest choices. The paper card 104 is a paper-based printable card given to the voter by a poll worker used to activate the voting device 102. The paper card 104 may be called an activation card before it is inserted into the voting device 102. The paper card 104 may be blank before being inserted into the voting device 102 or include markings thereon such as but not limited to markings to identify voter ballot eligibility. It is understood the paper card can be made from other materials besides paper.

Each contest choice corresponds to a contest in the election and the election may have one or more contests. Each contest includes one or more voting selection options (e.g., contest options) for the voter to select. A contest choice is the voting selection option(s) selected by the voter for a particular contest. Each contest choice may have no voting selection options made by the voter (e.g., an abstention), one voting selection option made by the voter or more than one voting selection options made by the voter. The contest choice by be correctly voted or incorrectly voted. A correctly voted contest choice contains the exact number of voter selected voting selection options permitted in the contest. For example, if a contest only permits one voting selection option to be selected, such as selecting a single candidate for U.S. President, a correctly voted contest choice includes only one voting selection option (e.g., a single candidate in this example) made by the voter. An incorrectly voted contest choice contains the incorrect number of voter selected voting selection options permitted in the contest. For example, the voter selected less voting selection options (e.g., an undervote) then available in the contest. It is understood that the system and methods described herein can utilize any kind of contest choices made by the voter, including but not limited to correctly voted contest choices, incorrectly voted contest choices and contest choices containing zero, one and more than one voting selection options made by the voter.

The voting device 102 includes a printer and is configured to print (e.g., mark) the voter's contest choices and other information on the paper card 104. The printer may print the voter's contest choices in a machine readable form along with a machine readable code that identifies the paper card as a voted ballot summary. As explained in further detail below, after the voting device 102 prints the contest choices on the paper card 104 the paper card is then scanned by the processing device 106 to create the CVR. Printing the contest choices on the paper card 104 turns the paper card from an activation card into a vote summary card. Preferably, the voting device 102 includes a display configured to present one or more contests of an election to a voter and an input device configured to receive one or inputs (e.g., selections) from the voter corresponding to the any and all contest choices made in each contest. For example, in one embodiment, the voting device 102 includes a touch screen that displays the contests and receives voter inputs. In one embodiment, the voting device is an ExpressVote® universal voting system from Election Systems & Software, LLC, which is a hybrid voting machine. Aspects of the voting device are further described herein and in U.S. Pat. Nos. 7,344,071, 8,733,646 and 8,814,045, the entire disclosures of which are expressly incorporated herein by reference, including the contents and teachings of any references contained therein.

In one embodiment, the voting device is configured to generate a machine-readable identification marking representing an identification code associated with the voter and print the machine-readable identification marking representing the identification code on the paper card 104. In the preferred embodiment, the identification code is an encrypted voter code based on a voter code assigned to the voter. In one embodiment, the voting device 102 is further configured to receive the voter code assigned to the voter, generate the encrypted voter code based on the voter code using an encryption key, and then generate and print the machine-readable identification marking on the paper card 104. Exemplary machine-readable identification markings include, but are not limited to, linear (e.g., one dimensional) barcodes, matrix barcodes (e.g., two dimensional barcodes, quick response (QR) codes, etc.), and the like. A poll worker may enter the voter code into the voting device 102 or the voting device may assign the voter a voter code from a preloaded list of voter codes. In one embodiment, the voting device 102 is configured to receive an input from the poll worker indicating the voter is creating a provisional ballot and/or prompt the poll worker to enter the voter code into the voting device.

In one embodiment, the voting device 102 also includes a scanner configured to scan the paper card 104 when the paper card is inserted into the voting device. The scanner enables the voting device 102 to scan and pick up any information (e.g., markings representing data) that may be on paper card 104. For example, in one embodiment, voting device 102 is configured to scan the paper card 104 and identify if the paper card already includes a machine-readable identification marking associated with a voter code.

The processing device 106 is configured to receive one or more pieces of paper 104, scan each paper card, read the any and all contest choices marked on the paper card, and store the any and all contest choices (e.g., the CVR) from the paper card in a results database. The results database includes all the CVRs from all the voters who scanned their paper card 104 in the processing device 106. The processing device 106 may be configured to read other pieces of information marked on the paper card 104, such as but not limited to ballot style and precinct information. The processing device 106 is also configured to read the machine-readable identification marking on the paper card 104 and associate the identification code represented by the machine readable identification marking with the any and all contest choices stored (e.g., the CVR) in the results database so that upon a determination that the voter is eligible to vote in the election, the any and all contest choices of the voter can be included in the corresponding one or more results (e.g., at least one result) of the election by identifying the identification code associated with the voter and including (e.g., adding) the any and all contest choices associated with the identification code in the one or more results. Each result corresponds to one contest in the election. In one embodiment, the one or more results for each contest are contained in an election results summary. Similarly, the identification code is associated with the any and all contest choices so that upon a determination that the voter is ineligible to vote in the election the any and all contest choices of the voter are excluded from the one or more results of the election by identifying the identification code associated with the voter and excluding the any and all contest choices associated with the identification code (e.g., subtracting the any and all contest choices from the election results). Specifically, the processing device 106 is configured to read the machine-readable identification marking and link the identification code, such as the encrypted voter code, with the any and all contest choices stored in the results database. In one embodiment, the processing device 106 is a D5200®, D5450® or D5850® precinct scanner and tabulator available from Election Systems & Software, LLC. Aspects of processing system 106 are further described herein and in U.S. Pat. No. 8,261,984, the entire disclosure of which is expressly incorporated herein by reference, including the contents and teachings of any references contained therein.

In some embodiments, the voting device 102 and the processing device 106 may be the same device such that this single device (e.g., combination voting/processing device) performs the same functions and has the same components as both the voting device and the processing device. In this embodiment, this single device, in addition to performing the functions above, is configured to print the information relating to the any and all contest choices on the paper card, give (e.g., eject) the paper card to the voter (or let the voter view the printed paper card through a window) and then allow the voter to re-insert the paper card into the single device to be scanned (or provide the voter with the option to accept or reject the printed paper card after the voter views it). In one embodiment, this single device is an ExpressVote® universal voting system from Election Systems & Software, LLC, as described above, configured (e.g., set up) as a ballot marking tabulator such that the ExpressVote performs the functions of both the voting device 102 and processing device 106. In an embodiment where an ExpressVote is used only as a voting device 102, the ExpressVote is configured as a ballot marking device and only performs the functions of the voting device. In another embodiment, this single device is an ExpressVote XL® full-face universal voting system from Election Systems & Software, LLC configured as a ballot marking tabulator. It is understood the ExpressVote XL® can be configured as a ballot marking device so that the ExpressVote XL® is a voting device 102.

The election management system 108 is configured to include and/or exclude the contest choices of the voter from the results of the election. The election management system 108 is configured to identify the any and all contest choices associated with the voter code assigned to the voter by matching the voter code with is corresponding identification code (e.g., encrypted voter code). Specifically, the election management system 108 is configured to access the results database (e.g., CVRs contained therein), read the identification codes associated with the contest choices contained in the results database (the identification codes may be stored in the results database or elsewhere, as explained below), identify the any and all contest choices corresponding to the identification code associated with the voter and include or exclude the any and all contest choices associated with the identification code in the one or more results of the election (e.g., the election results summary). In one embodiment, the election management system 108 is also configured to receive an input from an operator that includes the voter code assigned to the voter and an eligibility determination of the voter associated with the voter code. As mentioned above, the voter code and identification code are associated with one another. For example, as described above, the identification code can be an encrypted voter code formed by encrypting the voter code with an encryption key such that the unique encrypted voter code (broadly, identification code) is linked to the unique voter code. It is understood other ways of associating the voter code to the identification code are within the scope of the present disclosure.

Once the voter code and eligibility determination are entered into the election management system 108, the election management system is configured to include the any and all contest choices associated with the voter code in the one or more results of the election when the eligibility determination indicates the voter was eligible to vote in the election. Likewise, the election management system 108 is configured to exclude the any and all contest choices associated with the voter code from the one or more results of the election when the eligibility determination indicates the voter was ineligible to vote in the election. The eligibility determination indicates whether the corresponding voter was eligible or ineligible to vote and the process of establishing the eligibility or ineligibility of the voter is typically done by an election official for reasons described herein. In one embodiment, the election management system 108 is a computer, such as a desktop computer, with an election management system software configured to access the results database (e.g., the CVRs contained therein) and include or exclude the any and all contest choices contained therein in the one or more results of the election (broadly, the election results summary). The election management system software is configured to receive the input from the operator.

When the identification code is the encrypted voter code, the election management system 108 includes the encryption key used to encrypt the voter code so that the election management system can decrypt the encrypted voter code and match it to the voter code. Preferably, the election management system 108 is configured to prevent an operator from associating the voter code entered into the election management system with the corresponding any and all contest choices in the results database. Specifically, the election management system 108 is configured to prevent the operator from accessing the results database and configured to prevent the operator from accessing the decryption, thereby, preventing the operator from associating the voter code to the encrypted voter code. Preferably, the operator inputting the voter codes into the election management system 108 also does not have access to the paper cards 104 in a way that would allow paper cards to be associated with corresponding voter codes.

In one embodiment, the voting system 100 includes a poll book device (not shown) configured to provide the paper card 104 to the voter. The poll book device may be configured to check in a voter at a poll location. Thus, the poll book device may be configured to have access to the voter registration role. In one embodiment, the poll book device includes a printer and is configured to print (e.g., mark) the paper card 104. In one embodiment, the poll book device is configured to print the machine-readable identification marking representing the identification code on the paper card 104. In this embodiment, the poll book device may also include the encryption key and be configured to generate the encrypted voter code, as the identification code, using the encryption key based on the voter code assigned to the voter. In this embodiment, the poll book device may be configured to receive the voter code assigned to the voter in order to generate the encrypted voter code.

A poll worker may enter the voter code into the poll book device or the poll book device may assign the voter a voter code from a preloaded list of voter codes. In one embodiment, the poll book device is configured to indicate the voter is to receive a voter code because the voter is casting a type of ballot (e.g., provisional, early voting, in-person absentee) requiring a voter code. In one embodiment, the poll book device is configured to determine if the voter is casting a type of ballot requiring a voter code. In one embodiment, the poll book device is configured to prompt the poll worker to enter the voter code assigned to the voter into the poll book device. In one embodiment, the poll book device is an ExpressPoll®-5000 electronic poll book available from Election Systems & Software, LLC. Aspects of poll book device are further described herein and in U.S. Pat. No. 8,812,594, the entire disclosure of which is expressly incorporated herein by reference, including the contents and teachings of any references contained therein.

FIGS. 2-5 illustrate one embodiment of a voting method, generally indicated at 150, in accordance with the present disclosure. The voting method 150 is generally divided into two parts, the ballot casting method, generally indicated at 200, and the ballot processing method, generally indicated at 300. In this embodiment, the ballot casting method 200 of voting method 150 utilizes a hybrid voting machine, as described in more detail below. Generally, the ballot casting method 200 describes the steps for an individual voter to vote and exemplary variations that can occur in issuing the ballot, handling the ballot and processing the ballot based on (1) if the ballot is being cast on an election day or during an early voting/in-person absentee voting session and (2) whether the ballot is a provisional or challenged ballot that is excluded from the results until the eligibility of the voter can be determined or is a normal (e.g., non-provisional) ballot that is included in the results. Generally, the ballot processing method 300 describes the post-election process steps to process all the ballots and associated voter codes, determine the eligibility of including the ballots in the results of the election or reversing the inclusion status of the ballot as needed after the eligibility of the voter is determined.

Figure 2:
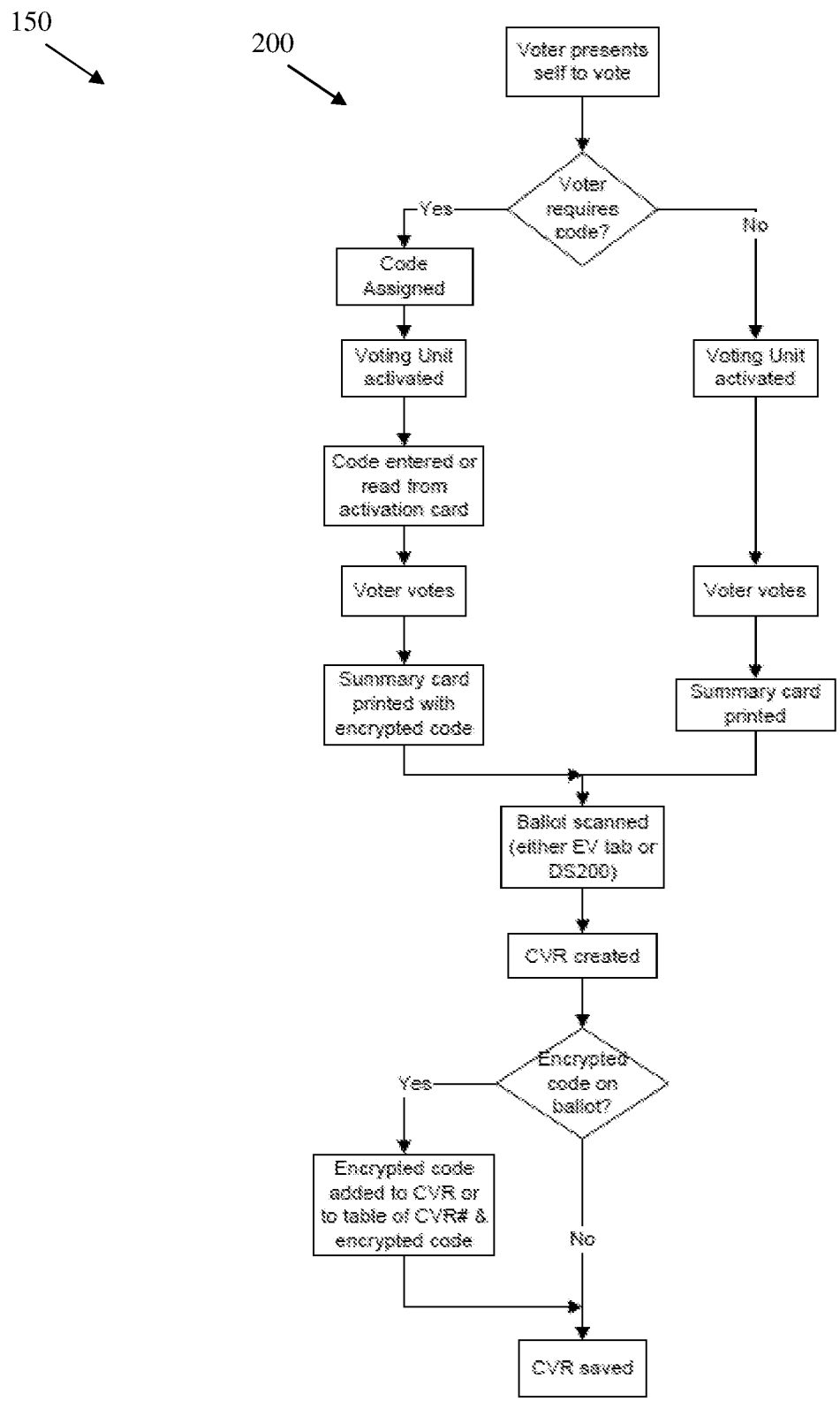
FIG. 2 is a simplified flow diagram illustrating a ballot casting method of a voting method according to an embodiment.

FIG. 2 is a flow diagram providing a general overview of one embodiment of the ballot casting method 200, a more detailed diagram of the ballot casting system being shown in FIG. 4 and described below. In general, to cast a ballot, a voter shows up to the poll location and if the voter does not require a voter code, the voter activates the voting device 102, votes using the voting device and then receives a vote summary card (e.g., paper card 104) with their contest choices printed thereon. If the voter does require a voter code, the voter code is assigned to the voter and used to create the identification code. The identification code is represented on the paper card 104 by a machine-readable identification marking. The voter then activates the voting device 102, which reads or creates the machine-readable identification marking, votes using the voting device and then receives the paper card back (now as a vote summary card) from the voting device 102 with their contest choices and machine-readable identification marking printed thereon. After receiving the vote summary card, the voter takes the vote summary card to a processing device 106, which scans the vote summary card and add the contest choices (e.g., CVR) to the results database. If there was no machine-readable identification marking on the vote summary card, the contest choices are saved in the results database and the voting process for the voter is over. If there was a machine-readable identification marking on the vote summary card, the processing device 106 associates the identification code represented by the machine-readable identification marking with the contest choices stored in the results database by using a table or adding the identification code to the results database. The processing device 106 then saves the contest choices and/or identification code in the results database and the voting process for the voter is now over.

Figure 3:
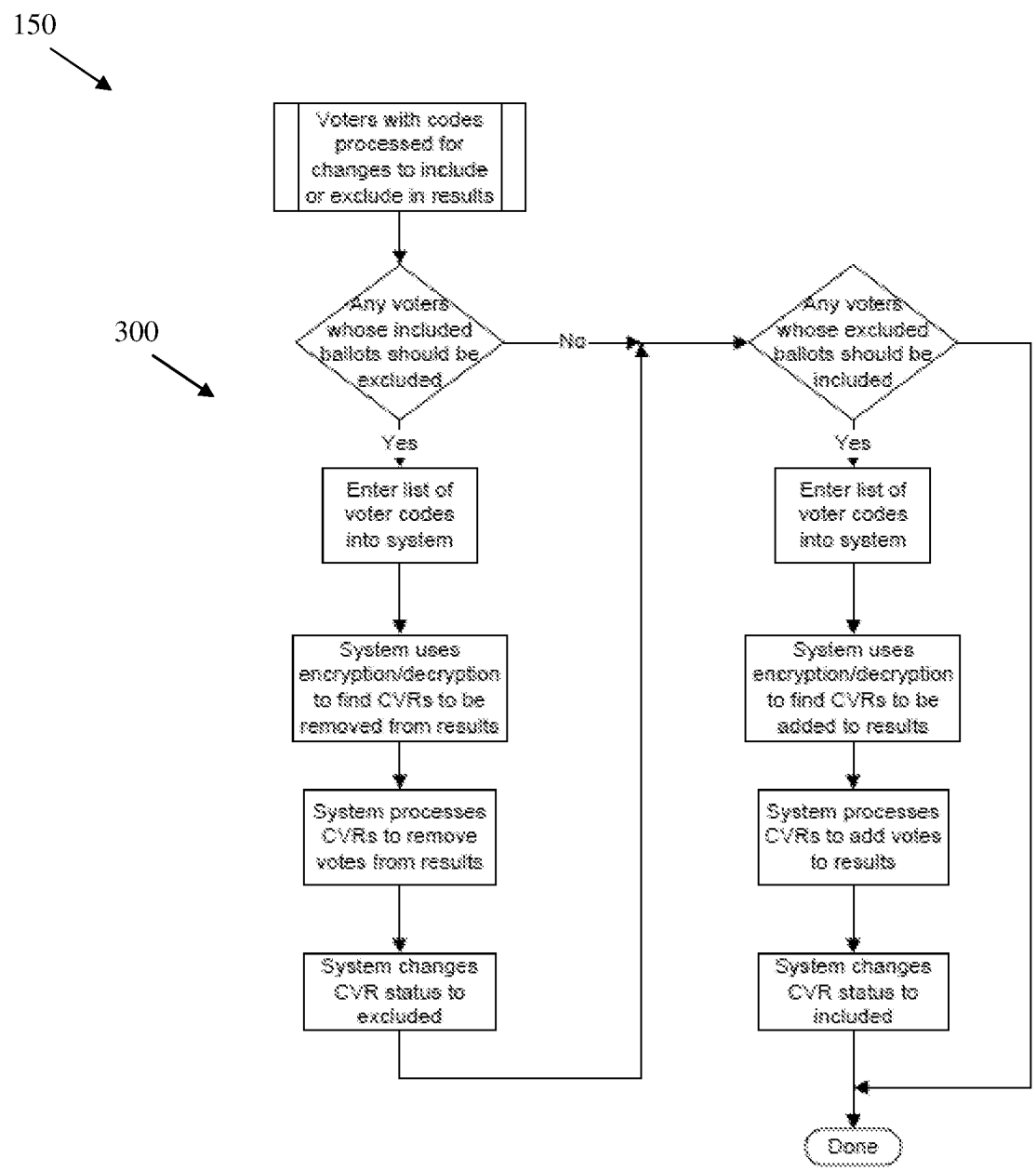
FIG. 3 is a simplified flow diagram illustrating a ballot processing method of the voting method according to an embodiment.

FIG. 3 is a flow diagram providing a general overview of one embodiment of the ballot processing method 300, a more detailed diagram of the ballot casting system being shown in FIG. 5 and described below. In general, ballots that have voter codes assigned to them are processed to determine if the contest choices indicated by the ballot should be included or excluded from the results of the election. If a determination is made that the voter associated with the voter code was ineligible to vote in the election, the corresponding contest choices of the voter are excluded from the results by the election management system 108. If a determination is made that the voter associated with the voter code was eligible to vote in the election, the corresponding contest choices of the voter are included in the results by the election management system. In either case, the election management system 108 receives the voter codes and a corresponding eligibility determination associated with each voter code representing whether the voter associated with the voter code is eligible or ineligible. The election management system 108 then matches voter codes to identification codes to identify the contest choices (e.g., CVR) in the results database associated with the voter. If the identification code is encrypted, the election management system uses the encryption key to decrypt the encrypted voter code (e.g., identification code) and then match it to the voter code (or alternatively to encrypt an entered voter code and match it against the stored encrypted code). After identifying the contest choices, the election management system 108 then removes or adds the contest choices from the results of the election. The election management system 108 also indicates whether the contest choices have been excluded or included in the results database. After all the changes have been made, the election management system 108 updates the results of each contest of the election, and the voting method 150 is finished.

Figure 4:
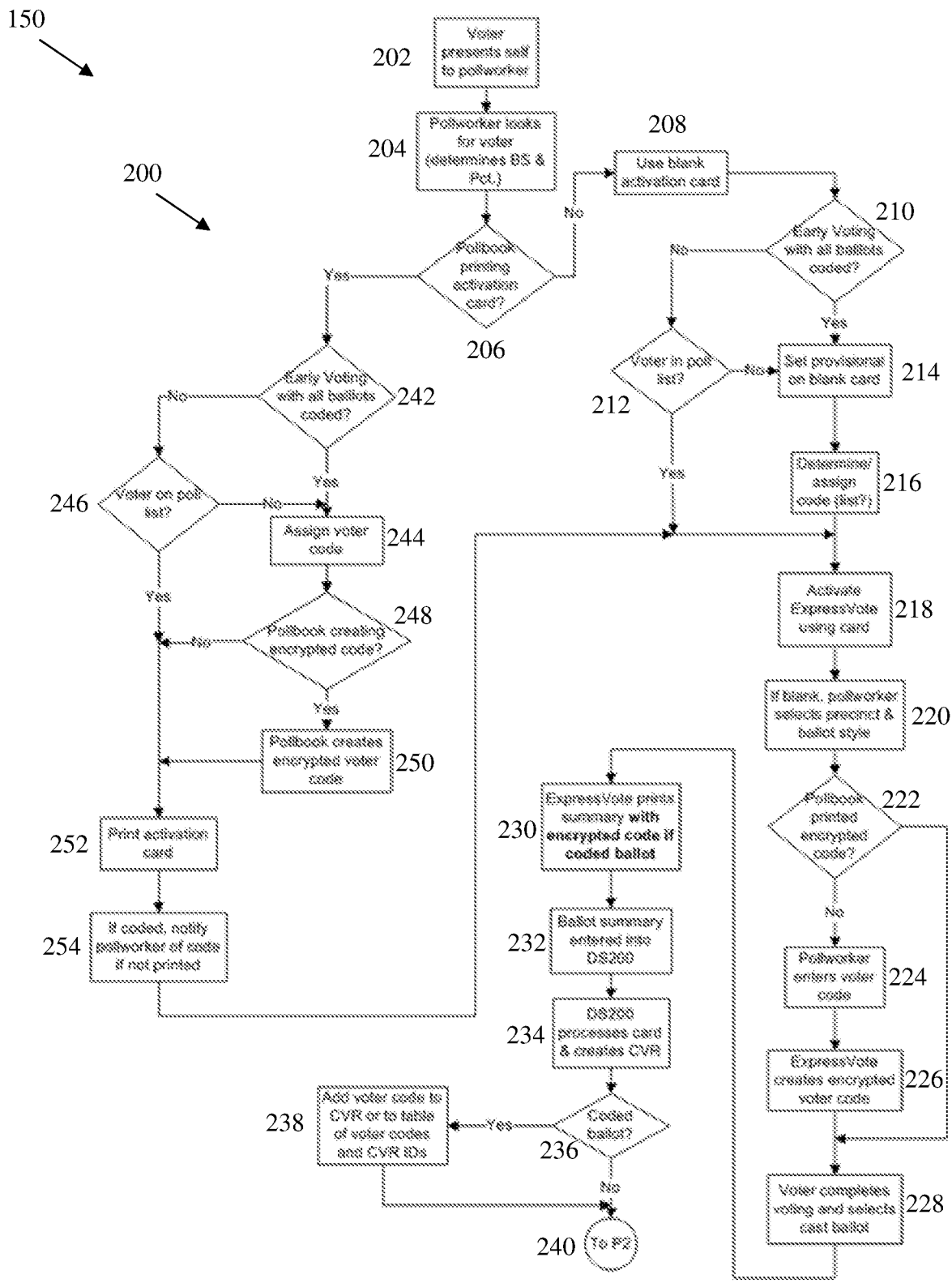
FIG. 4 is a detailed flow diagram illustrating the ballot casting method of FIG. 2.

FIG. 4 is a detailed flow diagram of one embodiment of the ballot casting method 200 of the voting method 150 using voting system 100. In this embodiment, the voting device 102 is an ExpressVote configured as a ballot marking device and the processing device 106 is a DS200. The ballot casting method 200 illustrated in FIG. 4 applies equally to an ExpressVote configured as a ballot marking tabulator such that the ExpressVote is both the voting device 102 and processing device 106. The ballot casting method 200 in FIG. 4 illustrates the process for a single voter. At 202, the voter arrives at the poll location and presents themselves to the poll worker to check in. When voting in person, the voter must appear before a poll worker to establish entitlement to vote and determine the precinct and ballot style associated with that entitlement. At 204, the poll worker checks in the voter by attempting to find the voter in the voter registration role of the poll book device. The poll book device may be electronic or physical. At this point, the ballot style and voting precinct for the voter is established. At 206, if the poll book device is an electronic poll book device, the poll book device may print the paper card 104, as an activation card, for the voter. If the poll book device prints the paper card 104, the yes path is taken to step 242. If the poll book device does not print the paper card 104, the no path is taken to step 208. Printing the paper card 104 at the poll book device allows a code to be printed on the paper card that identifies the precinct that the voter is in and the ballot style they are entitled to vote on. This code can be subsequently read by the voting device 102 to automatically select the precinct and ballot style for the voter when the voter is at the voting device.

At 208, if the poll book device did not print a paper card 104, a blank paper card is selected to be used to activate the voting device 102. As a result, the poll worker will have to select the precinct (if there is more than one precinct at the poll location) and the ballot style (if there is more than one ballot style in the precinct) as part of the activation process of the voting device 102. At 210, if the voter is voting during an early voting/in-person absentee voting session and the jurisdiction (e.g., state) assigns voter codes to very voter during these types of sessions, the yes path is taken to step 214 indicating the voter will be assigned a voter code and cast a provisional ballot. If the voter is voting on an election day or if the voter is voting during an early voting/in-person absentee voting session but the jurisdiction does not assign voter codes to every voter during these types of sessions, the no path is taken to step 212. It is understood that each jurisdiction conducting the election has its own rules governing whether the jurisdiction assigns voter codes during an early voting/in-person absentee voting session or not. If the no path is taken to 212, a determination is made on whether or not the voter is in the voter registration roll, which will allow the voter's precinct and ballot style to be determined. In addition, even if the voter is on the voter registration roll, a determination is made on if there is some other challenge to the voter's eligibility to vote in the current election. If either the voter is not on the voter registration roll or if the voter's eligibility to vote is being challenged, the no path is taken to step 214, indicating the voter will be assigned a voter code and cast a provisional ballot. If the voter is on the voter registration roll and the voter's eligibility to vote is not being challenged, the yes path is taken to step 218, indicating the voter will be casting a normal ballot to be included in the results of the election.

Reaching step 214 indicates the voter will be assigned a voter code. At 214, if control of having the voter code added to the ballot is going to be by marking a printed review box on the paper card 104, the box will now be marked by the poll worker. At 216, the voter is assigned a voter code. This can be done automatically by the poll book device or may be done manually by a poll worker from a preprinted list of voter codes, using preprinted stickers or some algorithmic determination methods. However the voter code is assigned to the voter, a record (which may be electronic or physical) is kept indicating which voter code was assigned to the voter, so that the voter code can be matched to the voter later on. This record may be stored by the poll book device or on a manual list.

At 218, the voter is ready to use the voting device 102 to make his or her contest choices. The paper card 104 is inserted into the voting device 102 (e.g., ExpressVote) to initiate the voting session. The paper card 104 may be a blank card or one printed by the poll book device. If the paper card 104 was printed by the poll book device, the paper card will have a code printed on it that identifies the precinct of the voter and the ballot style that the voter is entitled to vote. If the code indicating the precinct and ballot style is on the paper card 104, the voting device 102 reads the code and automatically selects the corresponding precinct and ballot style for the voter and the path is taken directly to step 222, skipping step 220. At 220, if the paper card 104 is blank and there is more than one precinct at the poll location and/or there is more than one ballot style available for the voters precinct, the poll worker selects the voter's precinct (if there is more than one) and must also select the ballot style that the voter is entitled to (if there is more than one ballot style for the precinct). If there is only one precinct and only one ballot style assigned to the precinct, poll worker selection is not required and the voting device 102 automatically selects the only precinct and ballot style available for the voter.

At 222, the voting device 102 determines whether a machine-readable identification marking associated with the voter code is to be printed on the paper card. If the voter has not received a voter code or if the paper card 104 already includes the machine-readable identification marking associated with the voter code, the voting device 102 does not print the machine-readable identification marking on the paper card and the path is taken to step 228. If the voter has been assigned a voter code (a provisional or challenged election day voter or an early voting/in-person absentee voter) and the paper card 104 does not include the machine-readable identification marking associated with the voter code, the voting device 102 will need to generate and print the machine-readable identification marking on the paper card and the path is taken to step 224. As mentioned above, the voting device 102 includes a scanner that scans the paper card 104 and can read the paper card to determine if a machine-readable identification marking associated with the voter code is on the paper card.

At 224, the voting device 102 begins the process associating the voter code to the voter's voted ballot. In other words, the voting device 102 beings the process of applying the machine-readable identification marking associated with the voter code to the paper card 104. The voting device 102 receives the voter code associated with the voter. In this example, this is done by a poll worker manually inputting the voter code into the voting device. In other embodiments, this may be done automatically by the voting device 102 selecting a next available voter code off a pre-established list of voter codes. In one embodiment, if the paper card 104 includes a review box that is marked, the voting device 102 will identify (e.g., scan, read, etc.) the marked review box and prompt the poll worker, using the display, to enter the voter code assigned to the voter. If the paper card 104 does not include a review box, in one embodiment, for election day voting the poll worker will enter an input into the voting device 102 (e.g., press a button) to indicate that this voter is casting a provisional ballot which will prompt the voting device to allow the poll worker to enter the voter code assigned to the voter. In one embodiment, for early voting/in-person absentee voting where all voters are assigned a voter code, the voting device 102 will automatically prompt the poll worker to enter the assigned voter code.

After the voting device 102 receives the voter code, at 226 the voting device creates the identification code associated with the voter code, and by extension the voter, that will be used to print the machine-readable identification marking representing the identification code on the paper card 104 when the paper card is printed with the voter's contest choices at step 230. Preferably, the identification code is an encrypted voter code based on the voter code assigned to the voter. The voting device 102 encrypts (e.g., obfuscates) the voter code to generate the identification code. The voting device 102 includes an encryption key and uses the encryption key to encrypt the voter code to generate the encrypted voter code. In another embodiment, the identification code may be the voter code. In one embodiment, the voting device 102 appends other codes such as precinct ID and/or machine ID (to eliminate inadvertent duplicate code assignments in the same or other polls) with the assigned voter code to create the identification code. In one embodiment, the voting device 102 uses the encryption key to encrypt the voter code and appended codes to create the identification code (e.g., encrypted voter code). The encryption key may be inputted in to the voting device 102 or the voting device may create the encryption key. Other methods of encrypting (e.g., obfuscating) the voter code and/or generating the identification code are within the scope of the present disclosure. After the voting device 102 generates the identification code, the voting device generates the machine-readable identification marking based on the identification code. The voting device 102 then prints the marking on the paper card 104 before the paper card is ejected, preferably at the same time the voting device marks the paper card with the any and all contest choices at step 230.

The method and process of applying the machine-readable identification marking on the paper card 104 is generally the same regardless if the poll book device (e.g., poll book) is applying the machine-readable identification marking on the paper card or if the voting device 102 is. Thus, it is to be understood that the steps taken by the voting device 102 to apply the machine-readable identification marking to the paper card 104 are generally the same as the steps the poll book device would take to apply the machine-readable identification marking on the paper card. If the poll book device applies the machine-readable identification marking, the poll book device will apply the marking between steps 216 and 218, as described in more detail below in steps 242-252. Accordingly, the paper card 104 would be inserted into the voting device 102 after the poll book device prints the machine-readable identification marking on the paper card. In this embodiment, the voting device 102 would identify the machine-readable identification marking and proceed to step 228, as described above.

At 228, the voter makes corresponding contest choices for each contest in the election using the voting device 102. Once all the contest choices have been made and reviewed for accuracy, the voter selects the option to print the ballot, which causes the voting device 102 to print the corresponding contest choices made by the voter on the paper card 104. At 230, the voting device 102 prints the contest choices, the machine-readable identification marking (if not done already at the poll book device), and any other information on the paper card 104. In other words, the voting device 102 receives any and all voting selection inputs from the voter, each input corresponding to a contest choice made by voter. For example, a voting selection input may be the selection of one contest option by the voter from a particular contest. This may be done by touching a spot on a screen or pushing a selection button after listening to an audio recording of the selection or any other suitable method. The voting device 102 then, after all the selections are made as indicated by a defined selection, marks the any and all contest choices made by the voter on the paper card 104 that was inserted into the voting device. As mentioned above, the machine-readable identification marking is a non-textual form, such as a bar code, to minimize the ability to associate the voter code with the machine readable identification marking on the paper card.

After the information is printed on the paper card 104, the paper card may now be called a vote summary card instead of an activation card, as the paper card now contains a summary of the selection made by the voter. Once the paper card 104 is a vote summary card, the paper card can no longer be used to activate the voting device (e.g., used as an activation card). If the paper card 104 as a vote summary card is inserted back into the voting device 102 in order to activate a voting session to allow the voter to make contest choices, the voting device will only read the paper card and display a summary of the contest choices on the paper card to the voter. The voting device 102 may also print information (e.g., machine-readable information) on the paper card 104 to indicate (e.g., identify) the paper card is now a vote summary card instead of an activation card.

At 232, the voting session for the voter is over and the voter is ready to cast their ballot (e.g., submit their paper card 104). The voting device 102 ejects or discharges the paper card 104 from itself. At this point, if the voter has been assigned a voter code for any reason, the paper card 104 will include the machine-readable identification marking representing the identification code associated with the voter when the paper card is discharged from the voting device, regardless if the voting device or the poll book device printed the machine-readable identification marking. The voter then takes the paper card 104, now containing their contest choices, to the processing device 106. The voter or a poll worker inserts the paper card 104 into the processing device 106. At 234, the processing device 106 scans the paper card 104, reads the any and all contest choices marked on the paper card, and stores the any and all contest choices in a results database (e.g., the processing device creates the CVR). In other words, the processing device 106 stores the any and all contest choices contained on the paper card 104 in the results database. Specifically, the processing device 106 stores allocation of all eligible votes associated with each contest on the ballot based on the any and all contest choices contained on the paper card in the results database. This includes contest undervotes if there are one or more eligible voting selection options not selected by the voter. In one embodiment, the processing device 106 also reads the ballot style ID on the paper card 104 and tabulates each contest associated with the ballot style ID based on reading any and all contest choices and stores the set of results in the results database. In an embodiment, where the voting device and processing device are a single device (e.g., the ExpressVote is configured as a ballot marking tabulator), the single device may automatically scan the paper card 104 for processing after the paper card is viewed by the voter through the window and before the paper card is discharged from the device or discharge the paper card and allow the paper card to be re-inserted to be scanned after the printed paper card is reviewed by the voter and then discharged into an attached ballot box.

At 236, following storing of the any and all contest choices in the results database (e.g., creating the CVR), if the paper card 104 includes the machine-readable identification marking, the processing device 106 identifies machine-readable identification marking and processes the paper card accordingly. The processing device 106 determines if the paper card 104 contains a machine-readable identification marking associated with a voter code assigned to the voter. This can be done simultaneously with the scanning of the paper card 104. If the paper card 104 includes a machine-readable identification marking, the yes path to step 238 is taken. If the paper card 104 does not include a machine-readable identification marking, the no path to step 240 is taken. The processing device 106 processes the paper card 104 regardless of whether the review box is marked on the paper card. If there is a marked review box on the paper card 104 but there is no machine-readable identification marking associated with a voter code, the processing device 106 will not accept the paper card and the paper card will have to be treated as a provisional paper ballot, described above.

At 238, the processing device 106 associates the identification code represented by the machine-readable identification marking with the corresponding any and all contest choices stored in the results database. Specifically, the processing device 106 scans and reads the machine-readable identification marking from the paper card. By reading the machine-readable identification marking, the processing device is able to extrapolate the identification code represented by the machine-readable identification marking. The processing device 106 then associates the identification code read from the paper card 104 with the vote selections (e.g., CVR) stored in the results database. In one embodiment, to associate the identification code with the contest choices in the results database, a table is built by the processing device 106 to link the identification code to the corresponding contest choices in the results database. In this embodiment, the table contains the identification code and a results identifier that indicates the location in the results database of the contest choices associated with the identification code. In another embodiment, to associate the identification code with the contest choices, the identification code is added to the results database in a corresponding assigned field. Other ways of associating the identification code with vote selections in the results database are within the scope of the present disclosure. As explained herein, this association between the identification code and contest choices in the results database is needed to subsequently include or exclude the contest choices from the results once the eligibility of the voter is determined. This is achieved, at least in part, by identifying the identification code assigned to the voter and including or excluding, respectively, the any and all contest choices associated with the identification code from the one or more results of the election.

At 240, the processing system 106 saves the results database and the ballot casting process 200 for this voter is now complete. The ballot casting method 200 repeats for every voter. Once the voter has voted, the voting method 150 moves to the ballot processing method 300. Specifically, from step 240 of the ballot casting method 200 the voting method 150 proceeds to step 302 in the ballot processing method 300.

Referring back to step 206, if the poll book device prints the paper card 104, the yes path is taken to step 242. At 242, if the voter is voting during an early voting/in-person absentee voting session and the jurisdiction (e.g., state) assigns voter codes to very voter during these types of sessions, the yes path is taken to step 244 indicating the voter will be assigned a voter code and cast a provisional ballot. If the voter is voting on election day or if the voter is voting during an early voting/in-person absentee voting session but the jurisdiction does not assign voter codes to every voter during these types of sessions, the no path is taken to step 246. If the no path is taken to 246, a determination is made on whether or not the voter is in the voter registration roll or if there is some other challenge to the voter's eligibility to vote in the current election. If either the voter is not on the voter registration roll or if the voter's eligibility to vote is being challenged, the no path is taken to step 244, indicating the voter will be assigned a voter code and cast a provisional ballot. If the voter is on the voter registration roll and the voter's eligibility to vote is not being challenged, the yes path is taken to step 252, indicating the voter will be casting a normal ballot to be included in the results of the election.

Reaching step 244 indicates the voter will be assigned a voter code. At 244, if control of having the voter code added to the ballot is going to be by marking a printed review box on the paper card 104, the box will now be marked by the poll worker or poll book device. At 216, the voter is assigned a voter code. This can be done automatically by the poll book device or may be done manually by the poll worker from a preprinted list of voter codes, using preprinted stickers or some algorithmic determination methods. However the voter code is assigned to the voter, a record (which may be electronic or physical) is kept indicating which voter code was assigned to the voter, so that the voter code can be matched to the voter later on. This record may be stored by the poll book device.

Either the poll book device or the voting device 102 can create the identification code and the corresponding machine-readable identification marker on the paper card based on the voter code assigned to the voter. At 248, if the poll book device is creating the identification code and corresponding machine-readable identification marker, the yes path is taken to step 250. If the voting device 102 is creating the identification code and corresponding machine-readable identification marker, the no path is taken to set 252 and the voting device 102 will generate the identification code and apply the corresponding machine-readable identification marker to the paper card 104, as described above in steps 222-226.

At 250, the poll book device generates the machine-readable identification marking associated with the voter code assigned to the voter. The poll book device takes the voter code assigned to the voter, which may be manually entered into the poll book device by a poll worker or automatically selected by the poll book device, and creates the identification code associated with the voter code and therefore the voter. Preferably, the identification code is an encrypted voter code based on the voter code assigned to the voter. The poll book device encrypts the voter code to generate the identification code. The poll book device includes an encryption key, which may be the same as the voting device 102, and uses the encryption key to encrypt the voter code to generate the encrypted voter code. In another embodiment, the identification code may be the voter code. In one embodiment, the poll book device appends other codes such as precinct ID and/or machine ID (to eliminate inadvertent duplicate code assignments in the same or other polls) with the assigned voter code to create the identification code. In one embodiment, the poll book device uses the encryption key to encrypt the voter code and appended codes to create the identification code (e.g., encrypted voter code). The encryption key may be inputted in or uploaded to the poll book device or the voting device may create the encryption key. Other methods of encrypting the voter code and/or generating the identification code are within the scope of the present disclosure.

At step 252, after generating the identification code and the machine-readable identification marker, the poll book device prints the paper card 104, including the machine-readable identification marking and any other information. The printed paper card 104 is voter specific and, preferably, also includes a bar code (or other machine-readable code) that identifies the precinct of the voter and the ballot style the voter is eligible to voter. This bar code will be read by the voting device 102, as described above. At 254, if the poll book device is not creating the identification code and, therefore, is not printing the machine-readable identification marking on the paper card 104, the poll book device notifies the poll worker so that the voter code can be subsequently entered into the voting device 102 by the poll worker to generate and print the machine-readable identification marking on the paper card. After step 254, the voter move on to step 218 and proceeds, as described above.

Figure 5:
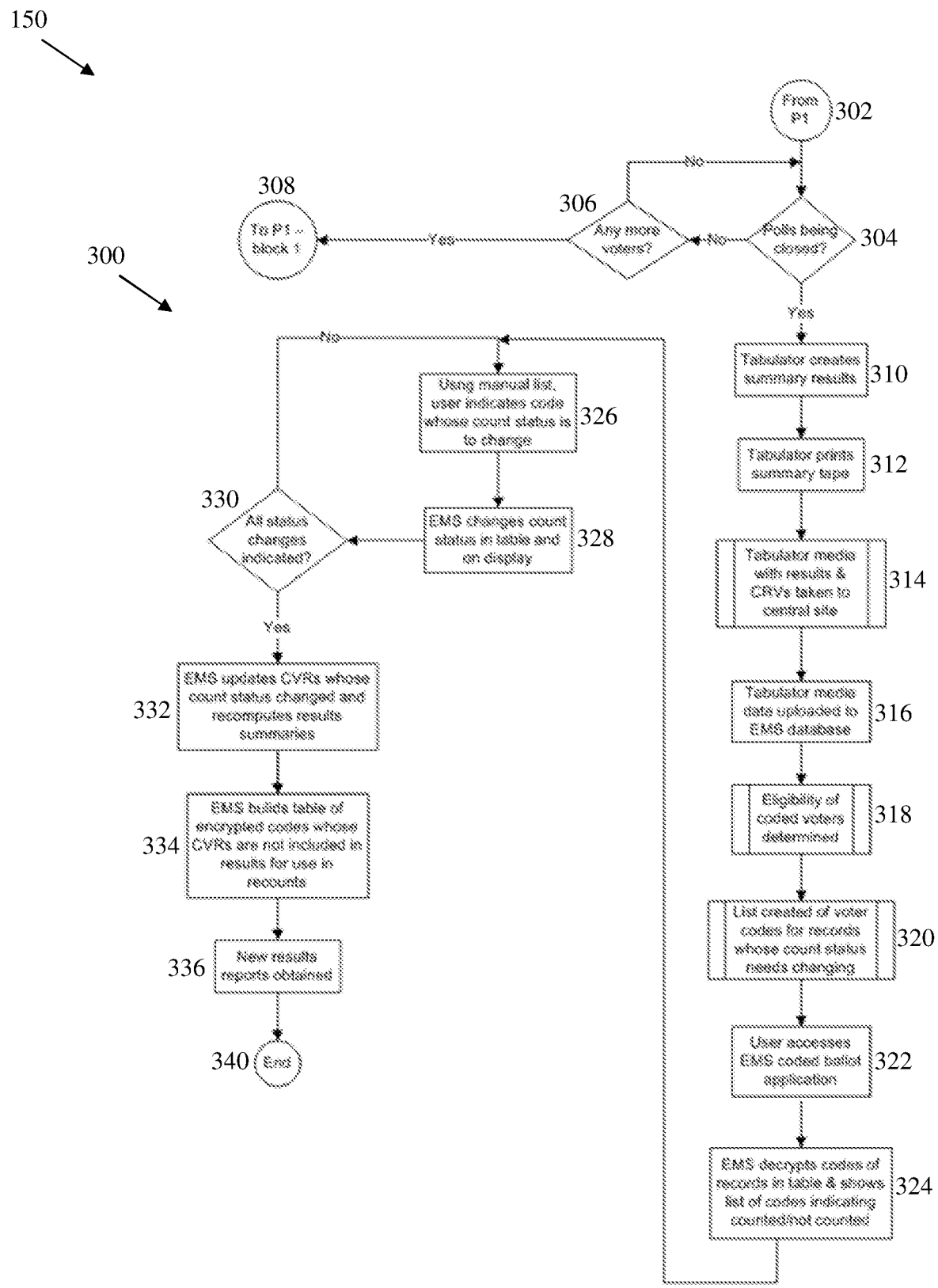
FIG. 5 is a detailed flow diagram illustrating the ballot processing method of FIG. 3.

FIG. 5 is a detailed block diagram of one embodiment of the ballot processing method 300 of the voting method 150 using voting system 100. The ballot processing method 300 generally occurs after all the voters have cast their ballots using ballot casting method 200. At 302, the ballot casting method 200 for the voter has ended at step 240 and the voting method 100 moves on to the ballot processing method 300 to take the voting method through the closing of the polls, determining the results and the handling of voter's ballots who were given a voter code. At 304, a determination is made if the polls are closed. Until the polls are closed and there is no more voting, the ballot processing method 300 does not move past this point. If the polls are closed, the yes path to step 310 is taken. If the polls are open, the no path to step 306 is taken. At 306, a determination is made if there are any voters to cast a vote. Since the ballot casting method 200 starts at 202 with a voter attempting to vote, if there are no voters waiting to vote, the path loops until another voter is present or the polls are closed. If there are no voters to cast a vote (e.g., no voters present), the no path to 304 is taken. This cycle repeats until the polls close. If there are one or more voters present to cast a vote (e.g., a voter is present), the yes path to 308 is taken, which goes back to step 202 of the ballot casting process 200 to take the one or more voters through the voting process so that the voter casts their ballot.

At 310, after the polls are closed, processing device 106 creates a summary of results and stores it, along with the results database and all the CVRs therein, on a computer readable media of the processing device, if not already stored there. Preferably, this stored information is encrypted for security. The encryption key that was used to encrypt the voter codes may also be included on the computer readable media to be used to decrypt the encrypted voter codes. This may be useful when the key used for encrypting the voter codes is not one that the election management software is already using. In one embodiment, the encryption key itself is also encrypted. Preferably, the encryption key is encrypted with the election definition encryption key that was used to encrypt the election definition by the election management system 108, and contained within the election management system, so that the election management system has the ability to decrypt and recover the encryption key for encrypted voter code decryption without any human involvement in the decryption process. The election definition encryption key may be a different key than is used to encrypt the files stored on the computer readable media.

At 312, if the processing device 106 is being used on an election day, the processing device may print a summary tape showing results for each contest in the election. The summary tape typically shows the results by precinct unless the number of precincts in the poll precludes this. Usually, a summary tape is not allowed to be printed for early voting/in-person absentee voting sessions until the close of the polls on the election day. For early voting/in-person absentee voting sessions, if a summary tape is printed at all, the tape is typically limited to showing number of ballots cast in each precinct at the poll. At 314, the computer readable media storing the results database, the encryption key, the results summary and any other information thereon is taken from the processing device 106 and taken to a central site for processing. Each processing device 106 may have its own computer readable media taken to the central cite or a plurality of processing devices can store their information on one computer readable media that is taken to the central site. In another embodiment, the data from each processing device may be electronically transmitted to the central site.

At 316, the computer readable media from the processing device 106 is read by the election management system 108, specifically the election management system software, and the information (e.g., data) from the media is uploaded into an election management system database (e.g., a master results database). This includes the results database containing the contest choices (e.g., CVRs) recorded by the processing device 106, possibly the encryption key used to encrypt the voter codes that will be used to decrypt the voter codes, and any other information stored by the media. In one embodiment, the election management system may segregate all the CVRs that have a corresponding identification code associated with it and/or build a table of all identification codes and associated CVR identifiers if the identification code is not part of the CVR. In an embodiment where data is electronically transmitted to the central site, the data is uploaded in the same fashion as when directly read from the media.

At 318, the eligibility of the voters assigned a voter code to vote in the election is determined. The eligibility determination is an administrative process handled by election officials. Each voter who was assigned a voter code is reviewed to see if they were eligible vote in the election and, correspondingly, if their contest choices can be included or excluded from the results of the election. In one embodiment, the contest choices of all the voters assigned a voter code are automatically included in the results of the election. However, in another embodiment, the contest choices of all the voters assigned a voter code may be automatically excluded in the results of the election until eligibility is determined. At 320, a list is created of the voter codes for those voters whose vote selections need to be included or excluding in the results based on the eligibility determination for the voter. At 322, the operator inputs the list of voter codes as well as an eligibility determination for each voter code into the election management system 108. This information is used by the election management system 108 to remove contest choices (e.g., CVR) from the results or add contest choices to the results, depending upon the eligibility determination for the voter. In one embodiment, two lists are created, one list containing voter codes corresponding to eligible voters and another list containing voter codes corresponding to ineligible voters and both lists (e.g., eligible list and ineligible list) are entered into the election management system 108. In another embodiment, the voter codes and associated eligibility determination may be entered individually.

At 324, the election management system 108 begins the process of associating or linking the entered voter codes with their corresponding contest choices. The election management system 108 takes each voter code entered and associates or matches it with its corresponding identification code to link the any and all contest choices associated with the identification code to the corresponding voter code. In the case where the identification code is an encrypted voter code based on the voter code, the election management system 108 take the encryption key and uses it to decrypt the encrypted voter code and link the any and all contest choices associated with the encrypted voter code to the corresponding voter code. Accordingly, only the election management system 108 can associate the voter code with the identification code (e.g., encrypted voter code) and the corresponding any and all contest choices of the voter assigned the voter code. In this manner, the anonymity and secrecy of the voter's contest choices are maintained and the eligibility of the voter can be determined without being able to access the contest choices of the voter.

For encrypted voter codes, at 324 the election management system 108 uses the encryption key to decrypt the encrypted voter codes and create a list of voter codes whose corresponding contest choices have been included in the results and/or those voter codes whose corresponding contest choices have been excluded from the results. These lists may be displayed to the operator or provide access of designated voter codes whose corresponding contest choices inclusion or exclusion status in the results will need to be changed.

At 326, the operator inputs a command (e.g., eligibility determination) into the election management system 108 to indicate the voter code whose corresponding contest choices inclusion or exclusion status in the results needs to change. This process may be done one precinct at a time with the election management system 108 displaying the included and excluded voter codes in lists for the precinct and give the operator the ability to drag a voter code from one list to the other, thereby changing the inclusion/exclusion status of the voter code. It is to be understood that other methods of inputting the eligibility determination into the election management system 108 may be used.

At 328, after the eligibility determination has been entered into the election management system 108, the election management system updates to display the inclusion or exclusion status of the voter code and tracks the change. The display of included and excludes lists of voter codes by the election management system 108 is beneficial as it shows all the voter codes and whether each voter code is include or excluded from the results. The display of included and excluded lists of voter codes also provides easy verification of correct voter code handling by the operator as well as easy correction of erroneous indications. The updating of the voter codes in the inclusion and exclusion lists may be done in real-time or the changing of the results of the election based on the inclusion or exclusion of contest choices associated with the voter codes may not be done in real-time. Preferably, the changing of the results based on the included and excluded voting sections is done in batches, such as after a portion of or all of the voter codes have had their eligibility determination entered. This is preferred in order to maintain ballot secrecy by preventing any indirect associations between the voter code and its corresponding contest choices. At 330, a determination is made on whether or not all the voter codes have had their eligibility determination entered into the election management system 108. In other words, have all the voter codes been marked eligible or ineligible or have all the voter codes been moved to the appropriate eligible or ineligible list. If all the voter codes have not yet had their eligibility determination entered, the no path is taken to 326, to enter the eligibility determination for the remaining voter codes. If all the voter codes have had their eligibility determination entered, the yes path is taken to 332.

At 332, the operator indicates (e.g., inputs a command) to the election management system 108 that the entering of the eligibility determinations for the voter codes is done the contest choices associated with the eligible and ineligible voters are ready to be included or excluded, respectively, from the results. Upon being told by the operator, the election management system 108 updates the results of the election by subtracting contest choices associated with voter codes designated as ineligible (e.g., assigned to an eligible voter) and/or adding contest choices associated with voter codes designated at eligible e.g., assigned to an ineligible voter). Specifically, the election management system 108 links each voter code with its corresponding any and all contest choices (e.g., CVR) stored in the results database. The election management system 108 matches the voter code to its corresponding identification code and then uses the identification code to find the contest choices (e.g., CVR) corresponding to that identification code, thereby linking the voter code to its corresponding any and all contest choices. Where the identification code is an encrypted voter code, the election management system 108 uses the encryption key to decrypt the encrypted voter code and match it to the voter code. Accordingly, the election management system 108 is able to identify the contest choices (e.g., CVR) for each voter code and include or exclude the contest choices in the results based on the eligibility determination. The election management system 108 then updates the results of each contest of the election accordingly.

At 334, the election management system 108 builds a table of identification codes that were not included in the results for use in possible recounts. As part of updating the results of the election, the election management system 108 may build a table of all the identification codes whose contest choices were not included in the results (or revise the table if existed before). In the event of a recount, this table can be downloaded to a processing device 106 used in the recount to skip tabulation from any paper card 104 containing a machine-readable identification marking representing an identification code contained in this table. This capability avoids the need to produce a list of excluded identification codes and locate the pieces of paper 104 whose machine-readable identification marking corresponds to one of the excluded identification codes in the table to exclude these pieces of paper from the recount.

At 336, the election management system 108 provides access to the updated results to the operator. These updated results include the changes made by the election management system 108 as a result of including and/or excluding contest choices. The updated results can be displayed in a format that is designated by the operator. For example, the results can be displayed by jurisdiction, precinct or any other style available. At 340, the voting method 150 ends as the voting and processing of all the ballots is complete.

In an aspect, the voting method 150 described herein maintains the anonymity and secrecy of provisional ballots and/or ballots cast during early voting/in-person absentee voting by a paper-based voting system while allowing the ballots to be recorded at the poll location. Specifically, the voting method 150 enables the any and all contest choices of each provisional ballot to be included in the tabulated results immediately after the provisional ballot is submitted at the poll location or enables the any and all contest choices of each provisional ballot to be stored (e.g., recorded) immediately after the provisional ballot is submitted at the poll location but excluded from the results. In either case, the voting method 150 enables the provisional ballots and corresponding contest choices to be subsequently validated and included in the election results and/or invalidated and excluded from the election results, all while preserving the anonymity of the voter who casted the provisional ballot. Such abilities were not previously possible in a paper-based election system such as a system using hybrid voting machines. In addition, the method described herein is cost-effective (e.g., no more envelopes to handle provisional ballots) and saves election offices time in processing provisional ballots, resulting in quicker election results. Using the voting method 150 also provides the ability to recount all the ballots, if needed, without manually removing the ineligible ballots from the ballots being recounted because voting method 150 can produce a list of the identification codes printed on the ballots (e.g., paper card 104) that are not eligible to be included in the results of the election as a result of invalidation.

Figure 6:
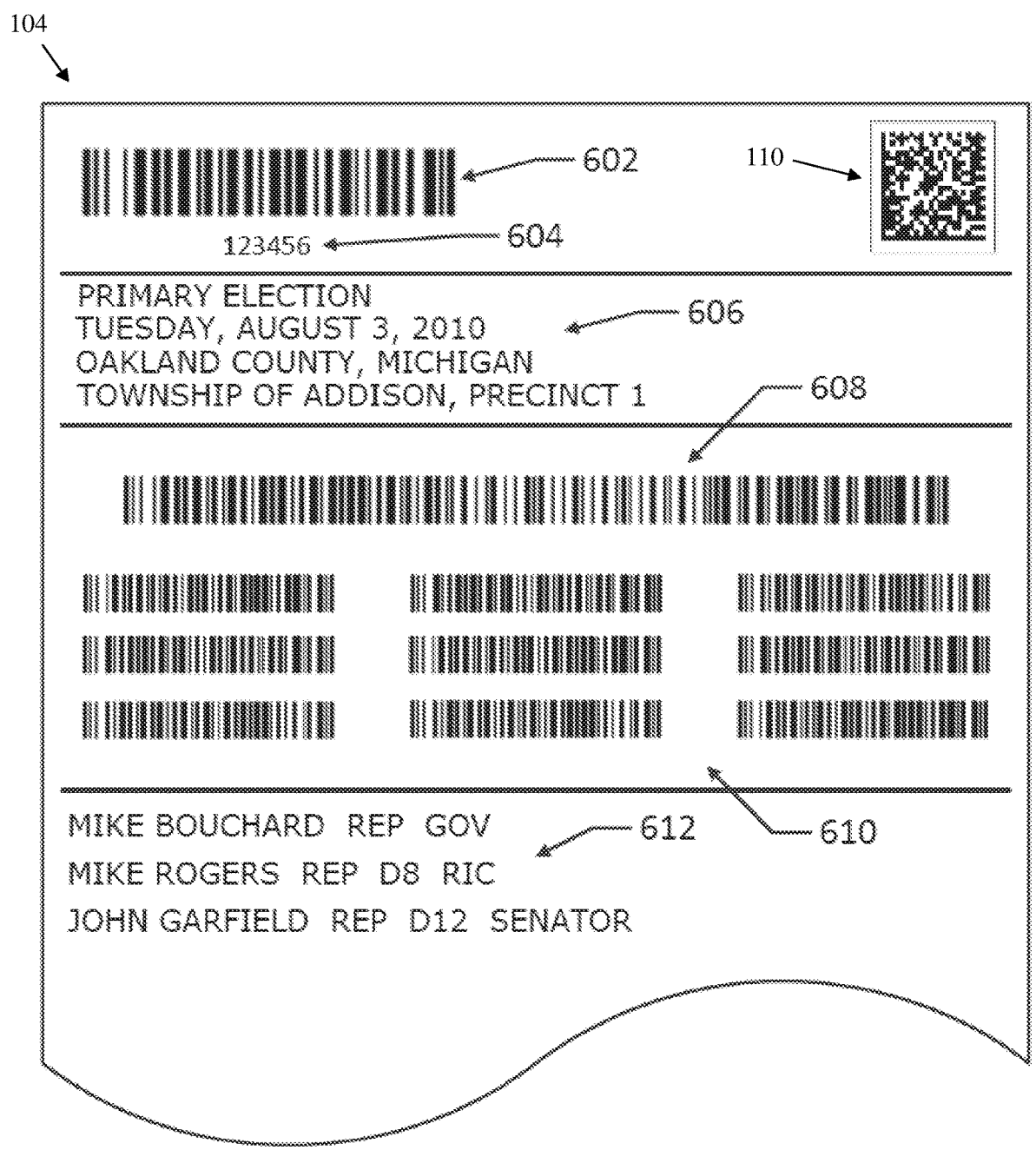
FIG. 6 illustrates an exemplary paper card used in the voting method according to an embodiment.

FIG. 6 illustrates an exemplary paper card 104 after the paper card leaves the voting device 102 (e.g., a vote summary card). The paper card 104 includes the machine-readable identification marking 110 representing the identification code. In the illustrated embodiment, the machine-readable identification marking 110 is a quick response code. As mentioned above, the machine-readable identification marking 110 is generated by either the poll book device or the voting device 102. The machine-readable identification marking 110 enables the processing device 106 to identify the paper card 104 as a provisional ballot and associate the identification code represented by the machine-readable identification marking with the contest choices on the paper card 104, stored by the processing device, so that the contest choices can be later identified and included or excluded in the results.

The paper card 104 may also include an activation barcode 602 and verification digits 604 if it was printed by a poll book device. Ballot header text 606, master barcode 608, vote selection barcodes 610, and text 612 are all printed by the voting device 102. The activation barcode 602 includes an optical, machine-readable representation of information that identifies an election code (e.g., 000-999) before the card is voted. In an embodiment, the scanner of the voting device 102 reads activation barcode 602, matches it with an election definition pre-loaded on the voting device, and generates the correct precinct ballot-style selection on graphical user interface voting screens displayed by the display. In another embodiment, a blank card may be used as the paper card 104 that activates the voting device 102 (e.g., a blank activation card), but unless there is only one precinct and one ballot style in the election definition in the voting device, the poll worker will have to select the voter's precinct and/or ballot style to activate the voting device for a specific voter.

The verification digits 604 enable a human to verify the accuracy of activation barcode 602. In an embodiment, verification digits 604 are human readable. The ballot header text 606 specifies the election name and location based on activation barcode 602. In an embodiment, ballot header text 606 is human readable. The master barcode 608 includes an optical, machine-readable representation of information that enables ballot processing device 106 to recognize card 104 content, including the associated precinct, ballot style ID, number of contest choices, number of barcodes, and the like. The ballot style ID is the information defining the contest list on the ballot to allow a blank ballot and any unvoted or incompletely voted contests to tabulate undervotes. In an embodiment, the master barcode 608 is a twenty-five digit barcode that includes a Precinct Internal ID (e.g., 10 digits), a Logical Ballot ID (e.g., 10 digits), number Write-In Selections (e.g., 3 digits), and Total Number of Selections (e.g., 3 digits). The vote selection barcodes 610 each include an optical, machine-readable representation of information that represents marked contest choices. The text 612 includes human-readable information that represents marked contest choices. In an embodiment, the vote selection barcodes 610 correspond to the selections shown in text 612.

Figure 7:
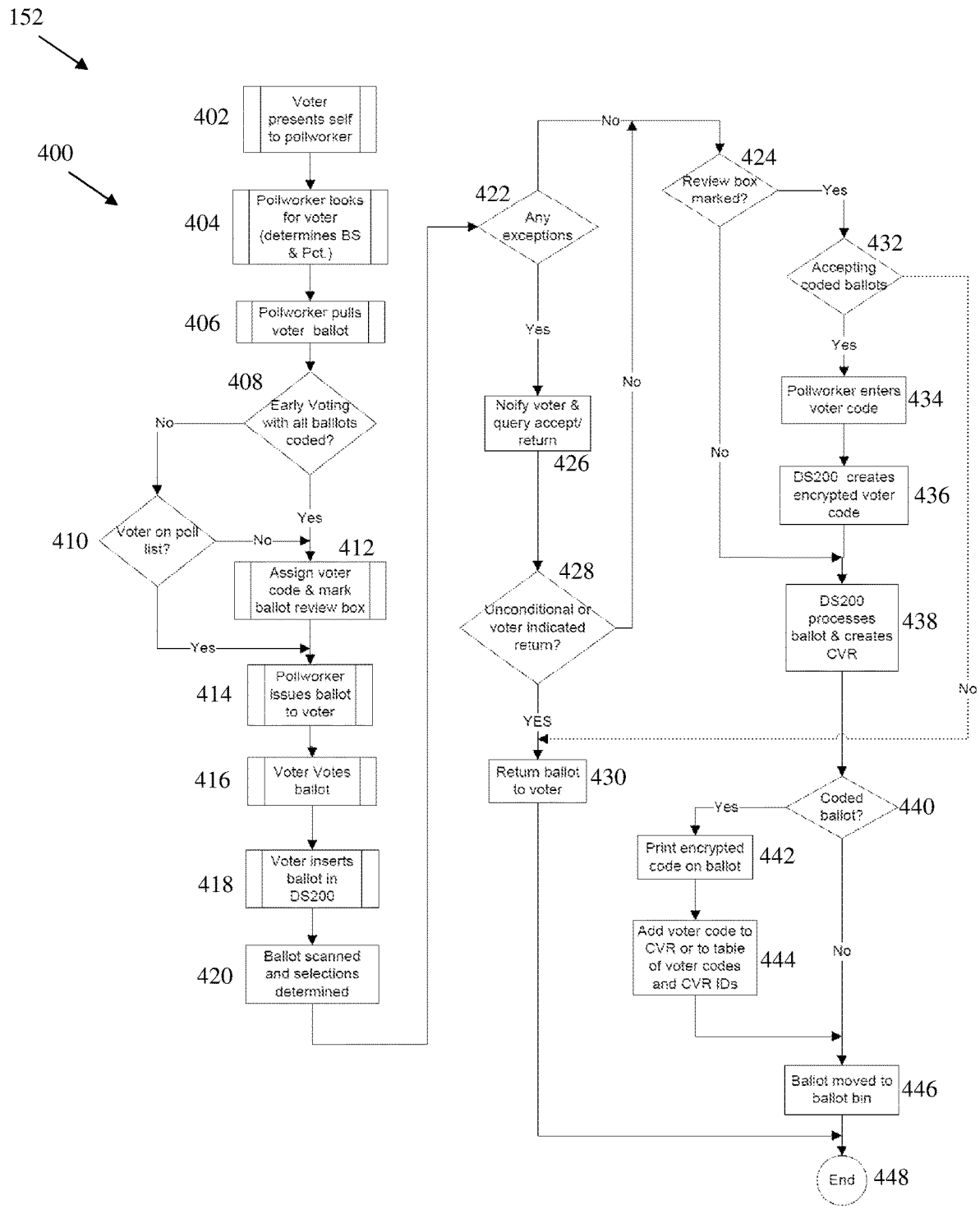
FIG. 7 is a detailed flow diagram illustrating a ballot casting method of a voting method according to another embodiment.

Referring to FIG. 7, another embodiment of a voting method in accordance with the present disclosure is generally indicated at 152. Voting method 152 is similar to voting method 150 and is generally divided into two parts, a ballot casting method, generally indicated at 400, and the ballot processing method 300, described above. In this embodiment, ballot casting method 400 of voting method 152 utilizes a paper ballot that is manually filled out by the voter (e.g., the voter manually makes each contest choice) and then the paper ballot is inserted into a processing device 106, to cast the paper ballot. In particular, ballot casting method 400 describes a paper ballot voting process where the processing device 106 that process the paper ballots can print a machine-readable identification marking on each paper ballot based on a voter code assigned to the voter associated with the paper ballot. As will become apparent, the general teachings and techniques used to preserve ballot anonymity and secrecy (e.g., voter code, identification code, machine-readable identification marking, encryption, etc.) as described above in relation to ballot casting method 200 apply equally to ballot casting method 400. In an embodiment, the paper card 104 comprises the paper ballot. Generally, the ballot casting method 400 describes the steps for an individual voter to vote and exemplary variations that can occur in issuing the ballot, handling the ballot and processing the ballot based on (1) if the ballot is being cast on an election day or during an early voting/in-person absentee voting session and (2) whether the ballot is a provisional or challenged ballot that is excluded from the results until the eligibility of the voter can be determined or is a normal (e.g., non-provisional) ballot that is included in the results. Voting method 152 includes ballot processing method 300, described above, and thus a detailed description of the ballot processing method 300 in relation to voting method 152 is omitted.

In this embodiment, ballot casting method 400 uses a processing device 106, as described above, that is further configured to apply a machine-readable identification marking, as described above, to the paper ballot that is associated with a unique voter code assigned to the voter, which is used to link the voter code to the cast vote record (CVR) created when the ballot is scanned. In other words, the processing device 106 includes some of the same functionality as the voting device 102 and/or poll book device. Specifically, the processing device 106 includes a printer and is configured to print (e.g., mark) information, such as the machine-readable identification marking, on the paper ballot. In addition, the processing device 106 for ballot casting method 400 may also include a display configured to present information to a poll worker and an input device configured to receive one or inputs from the poll worker.

The processing device 106 for ballot casting method 400 is configured to generate the machine-readable identification marking representing an identification code associated with the voter and print the machine-readable identification marking representing the identification code on the paper ballot. In the preferred embodiment, the identification code is an encrypted voter code based on a voter code assigned to the voter. In one embodiment, the processing device 102 is further configured to receive the voter code assigned to the voter, generate the encrypted voter code based on the voter code using an encryption key, and then generate and print the machine-readable identification marking on the paper ballot. A poll worker may enter the voter code into the processing device 106 or the processing device may assign the voter a voter code from a preloaded list of voter codes. In one embodiment, the processing device 106 is configured to receive an input from the poll worker indicating the voter is creating a provisional ballot and/or prompt the poll worker to enter the voter code into the processing device. In the preferred embodiment, the ballot has a designated box (e.g., review box) that is marked to identify that the ballot is a provisional ballot and, when read, prompts the poll worker to enter the voter code into the processing device 106. The processing device 106 can be configured to display other information and receive other inputs from the voter and/or poll worker. The processing device 106 in this embodiment is also configured to determine whether a paper ballot completed by the voter contains one or more voting selection errors, as described in more detail below, and inform the voter and/or poll worker that the paper ballot contains such errors.

Still referring to FIG. 7, the ballot casting method 400 of voting method 152 uses a paper ballot in order to cast the any and all contest choices made by a voter. In this embodiment, the ballot casting method 400 does not include a voting device 102 and includes a processing device 106, such as the DS200, that further includes a printer able to print the machine readable identification marking, such as a bar code, on the hand marked paper ballot. The ballot casting method 400 in FIG. 7 illustrates the process for a single voter. At 402, the voter arrives at the poll location and presents themselves to the poll worker to check in. When voting in person, the voter must appear before a poll worker to establish entitlement to vote and determine the precinct and ballot style associated with that entitlement. At 404, the poll worker checks in the voter by attempting to find the voter in the voter registration role of the poll book device. The poll book device may be electronic or physical. At this point, the ballot style and voting precinct for the voter is established, typically by the voter's residence address. At 406, the poll worker acquires the voter's paper ballot. Paper ballots are normally stocked by style in a polling placed (e.g., inventory). Once a poll worker has established the voter's precinct and ballot style are established, the poll worker can pull a paper ballot corresponding to the style of paper ballot the voter is eligible for from the inventory.

At 408, if the voter is voting during an early voting/in-person absentee voting session and the jurisdiction (e.g., state) assigns voter codes to very voter during these types of sessions, the yes path is taken to step 412 indicating the voter will be assigned a voter code and cast a provisional ballot. If the voter is voting on an election day or if the voter is voting during an early voting/in-person absentee voting session but the jurisdiction does not assign voter codes to every voter during these types of sessions, the no path is taken to step 410. If the no path is taken to 410, a determination is made on whether or not the voter is in the voter registration roll, which will allow the voter's precinct and ballot style to be determined. In addition, even if the voter is on the voter registration roll, a determination is made on if there is some other challenge to the voter's eligibility to vote in the current election. If either the voter is not on the voter registration roll or if the voter's eligibility to vote is being challenged, the no path is taken to step 412, indicating the voter will be assigned a voter code and cast a provisional ballot. If the voter is on the voter registration roll and the voter's eligibility to vote is not being challenged, the yes path is taken to step 414, indicating the voter will be casting a normal ballot to be included in the results of the election.

Reaching step 412 indicates the voter will be assigned a voter code and will cast a provisional ballot. The poll worker marks the ballot review box on the paper ballot, indicating a voter code needs to be assigned to the voter. As described in more detail below, the processing device 106 will identify the paper ballot as a provisional ballot because the review box is marked. As described herein, the voter code may come from a predefined list, issued by the poll book device or determined by some other mechanism. However the voter code is assigned to the voter, a record (which may be electronic or physical) is kept indicating which voter code was assigned to the voter, so that the voter code can be matched to the voter later on. This record may be stored by the poll book device or by some other device.

At 414, the poll worker issues the paper ballot to the voter. At 416, the voter marks their contest choices on the paper ballot by hand or the voter uses a ballot marking device that marks the contest choices on the paper ballot for the voter. In one embodiment, the ballot marking device is an Auto-MARK® ballot marking device from Election Systems & Software, LLC. Aspects of the ballot marking device are further described herein and in U.S. Pat. Nos. 8,063,885 and 8,814,045, the entire disclosures of which are expressly incorporated herein by reference, including the contents and teachings of any references contained therein.

At 418, after the voter has marked all of their contest choices on the paper ballot, the paper ballot is inserted in the processing device 106. This may be done by the voter or by a poll worker. At 420, after receiving the marked paper ballot, the processing device 106 scans the paper ballot. As the processing device 106 scans the paper ballot, the processing device identifies (e.g., reads) the contest choices marked on the paper ballot. In one embodiment, the processing device 106 will store a pixilated image of the paper ballot in its internal memory, store an image of mark channel sensor samples in its memory or read sensor output to determine the voting selections marked on the paper ballot and to determine the ballot style ID code of the paper ballot. If an image of the paper ballot is stored in memory, the image is processed once the scan is completed to determine the ballot style ID code and to identify all ballot positions that have been marked, in the set of active ballot positions as defined in the election definition for the ballot's style ID code. Once all of the contest choices have been identified, the processing device 106 determines if the paper ballot contains any voting selection errors that impact the validity of the paper ballot. Voting selection errors include, but are not limited to, over-voted contests, under-voted contest (which may have been identified for voter notification), cross-voted contest in an open primary and/or any selections that have not been adequately marked to be considered valid. At this time, the processing device 106 also checks (e.g., reads) the ballot review box to determine whether the review box is marked or not. At 422, a determination is made by the processing device 106 if the paper ballot contains any voting selection errors. If the paper ballot does not contain any voting selection errors, the no path is taken to step 424. If the paper ballot does contain one or more voting selection errors, the yes path is taken to step 426. In one embodiment, if the processing device 106 is not configured to handle provisional ballots, the processing device may still check the paper ballot for one or more voting selection errors but then unconditionally return the paper ballot to the voter and/or poll worker (upon detection of the marked review box) so that the paper ballot can be handled as a traditional provisional paper ballot, described above in the Background section.

At 426, if the paper ballot contains one or more voting selection errors, the processing device 106 notifies the voter and/or poll worker of the one or more selections errors. Depending upon the configuration of the processing device 106 and the type of voting selection errors, in some cases the processing device will not accept the paper ballot and unconditionally return the paper ballot to the voter and/or poll worker. In other cases, the processing device 106 may allow the voter to accept the paper ballot as is and/or return the paper ballot to the voter for correction. Such scenarios may depend upon how the election is run. At 428, a determination is made on whether or not to give the paper ballot back to the voter and/or poll worker. If at least one of the one or more voting selection errors (1) causes the ballot to be unconditionally returned or (2) is one where the processing device presents to the voter and/or poll worker the options to either accept the paper ballot as is (with the one or more voting selection errors) or return the paper ballot and the voter selects (e.g., indicates to the processing device) to have the paper ballot returned, the yes path is taken to step 430. If none of the one or more voting selection errors causes the ballot to be unconditionally returned and the voter selects to have the paper ballot accepted as is, the no path is taken to step 424.

At 430, the paper ballot containing the one or more voting selection errors is returned to the voter. At this time, if able, the voter may correct the voting selection errors and re-enter the corrected paper ballot into the processing device 106 at step 418. Alternatively, if step 430 is reached from step 432 described below (e.g., the paper ballot contains a marked review box but the processing device 106 is not configured to handle provisional ballots), the paper ballot is returned to the voter and then the paper ballot may be handled as a traditional provisional paper ballot, as discussed above in the Background section. In this case, the ballot casting process is over for the voter and the path is taken to step 448.

If the path from step 422 or step 428 is taken to step 424, at 424 the processing device 106 determines whether the review box on the paper ballot is marked, indicating this ballot will be a provisional ballot and need to be associated with a voter code assigned to the voter. If the review box on the paper ballot is marked, the yes path is taken to step 432. If the review box on the paper ballot is not marked, the no path is taken to step 438. At 432, a determination is made by the processing device 106 on whether or not it can accept provisional paper ballots. A processing device 106 can accept provisional paper ballots if it is configured to accept them. Specifically, the processing device 106 must be configured to print the machine-readable identification marking on the paper ballot and associate the identification code represented by the machine-readable identification marking with the any and all contest choices read and stored by the processing device (e.g., CVR). If the processing device can accept provisional paper ballots, the yes path to step 434 is taken. If the processing device 106 cannot accept provisional paper ballots, the no path to step 430 is taken.

Reaching step 434 indicates the processing device 106 will need to generate the machine-readable identification marking and the processing device begins the process of applying the machine-readable identification marking associated with the voter code on the paper ballot. At 434, the processing device 106 receives the voter code assigned to the voter. This may be done manually by a poll worker who inputs the voter code into the processing device 106 or this may be done automatically by the processing device by selecting a voter code from a pre-established list of voter codes. If the voter code is entered manually, the processing device 106, after determining the review box is marked, may prompt the poll worker to enter the voter code assigned to the voter. If the voter code is selected by the processing device 106, the poll worker is notified of the chosen code and records the code for later use.

After the processing device 106 receives the voter code, at 436 the processing device creates the identification code associated with the voter code, and by extension the voter, so that the processing device can then print the machine-readable identification marking representing the identification code on the paper ballot. Preferably, the identification code is an encrypted voter code based on the voter code assigned to the voter. The processing device 106 encrypts (e.g., obfuscates) the voter code to generate the identification code. The processing device 106 includes an encryption key and uses the encryption key to encrypt the voter code to generate the encrypted voter code. In another embodiment, the identification code may be the voter code. In one embodiment, the processing device 106 appends other codes such as precinct ID and/or machine ID (to eliminate inadvertent duplicate code assignments in the same or other polls) with the assigned voter code to create the identification code. In one embodiment, the processing device 106 uses the encryption key to encrypt the voter code and appended codes to create the identification code (e.g., encrypted voter code). The encryption key may be inputted in or uploaded to the processing device 106 or the processing device may create the encryption key. Other methods of encrypting (e.g., obfuscating) the voter code and/or generating the identification code are within the scope of the present disclosure. After the processing device 106 generates the identification code, the processing device generates the machine-readable identification marking based on the identification code and prints the marking on the paper ballot, as described below.

At 438, the processing device 106 identifies all the contest choices marked on the paper ballot and then accepts all of the valid selections as votes, updating all contest and ballot statistics. The processing device 106 then creates the CVR, recording the any and all contest choices for all contests associated with the paper ballot in the results database. In some embodiments, the processing device 106 may also incorporates all of the ballot choices, valid votes and all statistics in the CVR as well as any precinct and ballot style identification.

At 440, a determination is made if a voter code was assigned to the voter casting the paper ballot. If there is a voter code associated with the paper ballot, the yes path is taken to step 442. If the paper ballot is not associated with the voter code, the no path is taken to step 446. At 442, the processing device 106 generates the machine readable identification marking representing the identification code based on the voter code assigned to the voter and prints the machine readable identification marking on the paper ballot. As mentioned above, the machine-readable identification marking is a non-textual form. At 444, the processing device 106 then associates (e.g., links) the identification code it created with the corresponding set of contest choices (e.g., CVR) stored in the results database. The processing device 106 may scan the machine-readable identification marking for the identification code after the marking is printed on the paper ballot to acquire the identification code and associate it with the any and all contest choices or, since the processing device knows the identification code because the processing device created it, the processing device automatically associates the identification code with the any and all contest choices. As mentioned above, the associating the identification code to the contest choices in the results database can be done using a table or by adding the identification code to the results database. As explained herein, this association between the identification code and contest choices in the results database is needed to subsequently include or exclude the contest choices from the results once the eligibility of the voter is determined. This is achieved, at least in part, by identifying the identification code assigned to the voter and including or excluding, respectively, the any and all contest choices associated with the identification code from the one or more results.

At 446, the processing of the paper ballot by the processing device 106 is completed and the paper ballot is moved to the ballot bin. At 448, the ballot casting method 400 for this individual voter is now completed. It is understood the ballot casting method 400 repeats for every voter. Once the voter has voted, the voting method 152 moves to the ballot processing method 300. Specifically, from step 448 of the ballot casting method 400 the voting method 152 proceeds to step 302 in the ballot processing method 300, described above. Ballot processing method 300 is the same, regardless of the ballot casting method 200, 400 used.

In addition to the embodiments described above, embodiments of the present disclosure may comprise a special purpose computer including a variety of computer hardware, as described in greater detail below.

The following discussion is intended to provide a brief, general description of a suitable computing environment in which aspects of the disclosure may be implemented. Although not required, aspects of the disclosure are described in the general context of computer-executable instructions (i.e., software), such as application programs, program modules, and/or program data stored in memory for execution by computers. Generally, program modules include routines, functions, programs, objects, components, data structures, etc. that perform particular tasks or implement particular abstract data types when executed by a processor in a computer or other device. Computer-executable instructions, associated data structures, and program modules represent examples of the program code means for executing steps of the methods disclosed herein. The particular sequence of such executable instructions or associated data structures represent examples of corresponding acts for implementing the functions described in such steps. Advantageously, computer processors described herein have the capability to perform all operations (e.g., execute computer-executable instructions) in real-time. In addition, the functionality may be embodied in whole or in part in firmware or hardware equivalents such as integrated circuits, application specific integrated circuits (ASICs), field programmable gate arrays (FPGAs), and the like.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. When used in a LAN networking environment, the computer is connected to the local network through a network interface or adapter. When used in a WAN networking environment, the computer may include a modem, a wireless link, or other means for establishing communications over the wide area network, such as the Internet. In a networked environment, program modules depicted relative to the computer, or portions thereof, may be stored in the remote memory storage device. It will be appreciated that the network connections described herein are exemplary and other means of establishing communications between computers over a network may be used. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A voting system for preserving the anonymity of a provisional ballot cast by a voter in an election whose eligibility to vote in the election is not yet determined, the voting system comprising:
   a voting device configured to receive one or more contest choices from the voter and to mark the one or more contest choices on a paper card associated with the voter, each contest choice corresponding to a contest of the election, the voting device further configured to discharge the paper card from the voting device after the paper card is marked with the one or more contest choices, wherein the paper card includes a machine-readable identification marking representing an identification code associated with a voter when the paper card is discharged from the voting device; and
   a processing device configured to receive the paper card, read the one or more contest choices marked on the paper card, and store the one or more contest choices in a results database, wherein the processing device is configured to read the machine-readable identification marking and associate the identification code represented by the machine-readable identification marking with the one or more contest choices stored in the results database, wherein upon a determination that the voter is eligible to vote in the election the one or more contest choices of the voter are included in one or more results of the election by identifying the identification code associated with the voter and including the one or more contest choices associated with the identification code.

2. The voting system of claim 1, wherein the identification code represented by the machine-readable identification marking is an encrypted voter code based on a voter code assigned to the voter.

3. The voting system of claim 2, wherein the voting device is configured to generate the encrypted voter code using an encryption key based on the voter code assigned to the voter.

4. The voting system of claim 2, wherein the processing device is configured to read the machine-readable identification marking and link the encrypted voter code with the one or more contest choices of the voter stored in the results database.

5. The voting system of claim 2, further comprising an election management system configured to identify the one or more contest choices associated with the voter code by matching the voter code with the encrypted voter code corresponding to the voter code.

6. The voting system of claim 2, further comprising a poll book device configured to provide the paper card to the voter.

7. The voting system of claim 6, wherein the poll book device is configured to generate the encrypted voter code using an encryption key based on the voter code assigned to the voter.

8. The voting system of claim 6, wherein the poll book device includes a printer configured to print the machine-readable identification marking on the paper card.

9. The voting system of claim 1, wherein the voting device includes a printer configured to print the machine-readable identification marking on the paper card.

10. The voting system of claim 1, wherein the election management system is configured to receive an input from an operator, the input including a voter code assigned to the voter and an eligibility determination of the voter associated with the voter code, wherein the voter code is associated with the identification code, wherein the election management system is configured to include the one or more contest choices associated with the voter code in the at least one result of the election when the eligibility determination indicates the voter was eligible to vote in the election and wherein the election management system is configured to exclude the one or more contest choices associated with the voter code in the at least one result of the election when the eligibility determination indicates the voter was ineligible to vote in the election.

11. The voting system of claim 1, wherein upon determination that the voter is ineligible to vote in the election the one or more contest choices of the voter is excluded from the one or more results of the election by identifying the identification code associated with the voter and excluding the one or more contest choices associated with the identification code.

12. The voting system of claim 1, further comprising the paper card.

13. A computer-implemented method for preserving the anonymity of a provisional ballot cast by a voter in an election whose eligibility to vote in the election is not yet determined, the method comprising:
   discharging a paper card from the voting device, wherein the paper card has one or more contest choice from the voter marked thereon and includes a machine-readable identification marking representing an identification code associated with the voter when the paper card is discharged from the voting device;
   reading the one or more contest choices marked on the paper card;
   storing the one or more contest choices in a results database;
   reading the machine-readable identification marking from the paper card; and associating the identification code represented by the machine-readable identification marking with the one or more contest choices stored in the results database, wherein upon a determination that the voter is either eligible or ineligible to vote in the election the one or more contest choices of the voter can be included in or excluded from, respectively, at least one result of the election by identifying the identification code associated with the voter and including or excluding, respectively, the one or more contest choices associated with the identification code.

14. The method of claim 13, further comprising encrypting a voter code assigned to the voter to generate the identification code represented by the machine-readable identification marking.

15. The method of claim 14, wherein encrypting the voter code comprises using an encryption key to encrypt the voter code assigned to the voter.

16. The method of claim 14, further comprising identifying the one or more contest choices associated with the voter code by matching the voter code with the identification code corresponding to the voter code.

17. The method of claim 13, further comprising printing, by the voting device, the machine-readable identification marking on the paper card before the paper card is discharged from the voting device.

18. The method of claim 13, further comprising printing, by a poll book device, the machine-readable identification marking on the paper card.

19. The method of claim 18, further comprising inserting the paper card into the voting device after printing the machine-readable identification marking thereon by the poll book device.

20. The method of claim 13, further comprising:
receiving an input from an operator in an election management system, the input including the voter code and an eligibility determination of the voter associated with the voter code, the voter code associated with the identification code;
including the one or more contest choices associated with the voter code in the at least one result of the election when the eligibility determination indicates the voter was eligible to vote in the election; and
excluding the one or more contest choices associated with the voter code from the at least one result of the election when the eligibility determination indicates the voter was ineligible to vote in the election.

* * * * *